United States Patent
Kagaya

(10) Patent No.: US 12,526,868 B2
(45) Date of Patent: Jan. 13, 2026

(54) COMMUNICATION DEVICE AND CONTROL METHOD FOR REGISTRATION AND OBTAINING IDS

(71) Applicant: Canon Kabushiki Kaisha, Tokyo (JP)

(72) Inventor: Sosuke Kagaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 18/468,837

(22) Filed: Sep. 18, 2023

(65) Prior Publication Data

US 2024/0114578 A1   Apr. 4, 2024

(30) Foreign Application Priority Data

Sep. 29, 2022 (JP) .................................. 2022-156469

(51) Int. Cl.
 *H04W 76/19* (2018.01)
 *H04W 76/14* (2018.01)
 *H04W 76/18* (2018.01)

(52) U.S. Cl.
 CPC .......... *H04W 76/19* (2018.02); *H04W 76/18* (2018.02)

(58) Field of Classification Search
 CPC ...... H04W 76/19; H04W 76/18; H04W 76/14
 See application file for complete search history.

(56) References Cited

U.S. PATENT DOCUMENTS

| 7,979,028 B2 * | 7/2011 | Matsuda | H04W 76/15 |
| | | | 455/414.3 |
| 2008/0119137 A1 * | 5/2008 | Lee | H04W 4/18 |
| | | | 455/41.2 |
| 2022/0264512 A1 * | 8/2022 | Mizuguchi | H04W 28/0268 |
| 2023/0067521 A1 * | 3/2023 | Yang | H04W 48/18 |

FOREIGN PATENT DOCUMENTS

JP   2021078002 A   5/2021

* cited by examiner

Primary Examiner — Harry H Kim
(74) Attorney, Agent, or Firm — Venable LLP

(57) ABSTRACT

A communication device comprises a first and second communication circuits capable of establishing a connection with an external device conforming to a first and second communication standards, respectively. The device further comprises a storage device stores information about external device(s) registered in an application that uses communication with an external device. The device, when a reconnection request is received from an external device through the first communication circuit or the second communication circuit, outputs a warning if a registration of the external device in the application has been deleted. It is determined whether the registration of the external device in the application has been deleted based on identification information of the external device. The identification information is obtained through different procedures depending on through which of the first and second communication circuits the reconnection request has been received.

13 Claims, 19 Drawing Sheets

F I G. 6

| INDEX | NAME | IDENTIFICATION INFORMATION |
|---|---|---|
| 1 | Camera A | 11-22-33-44-55-66 |
| 2 | Camera B | 77-88-99-00-11-22 |
| 3 | Camera C | 12-34-56-78-90-12 |

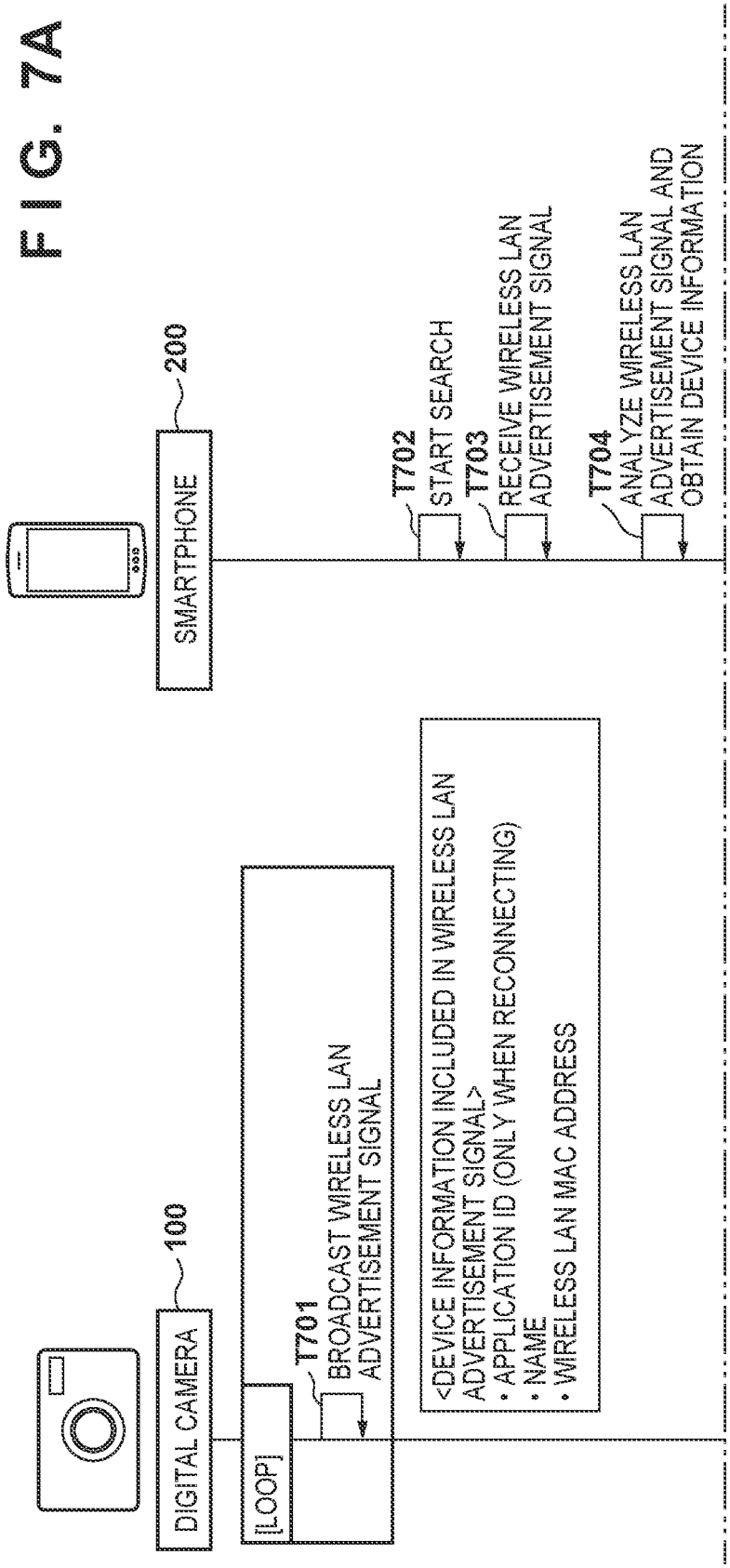

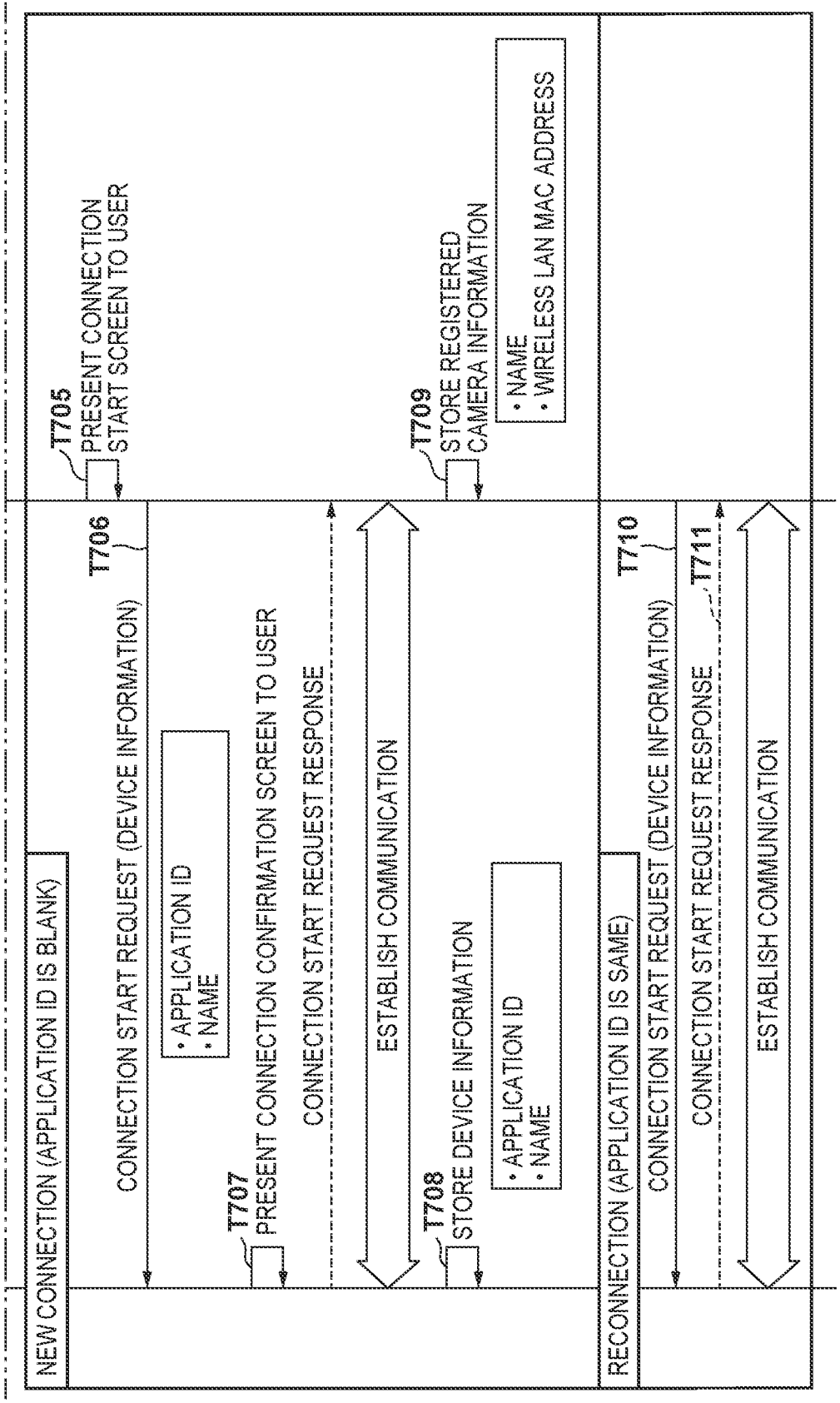

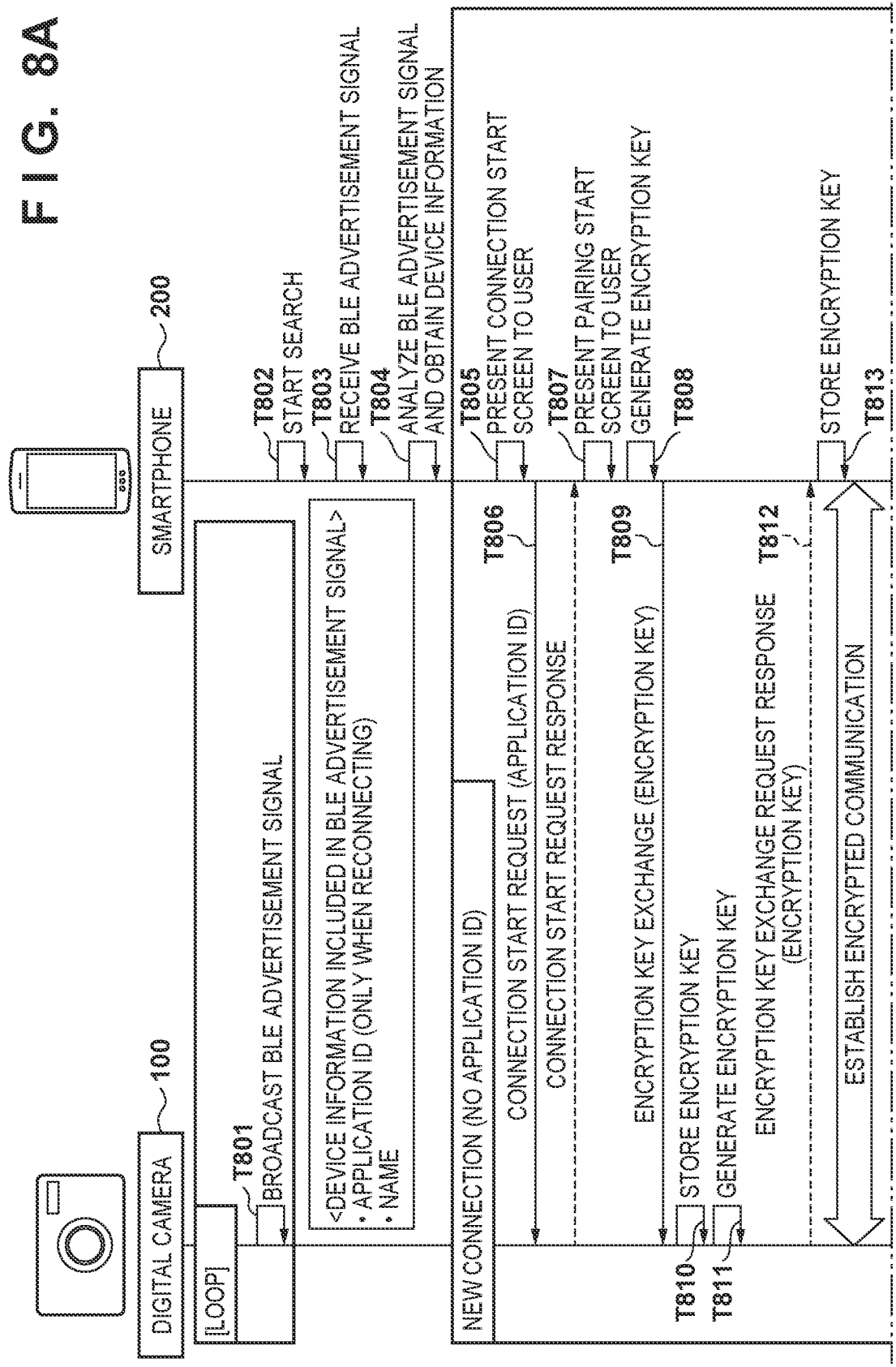

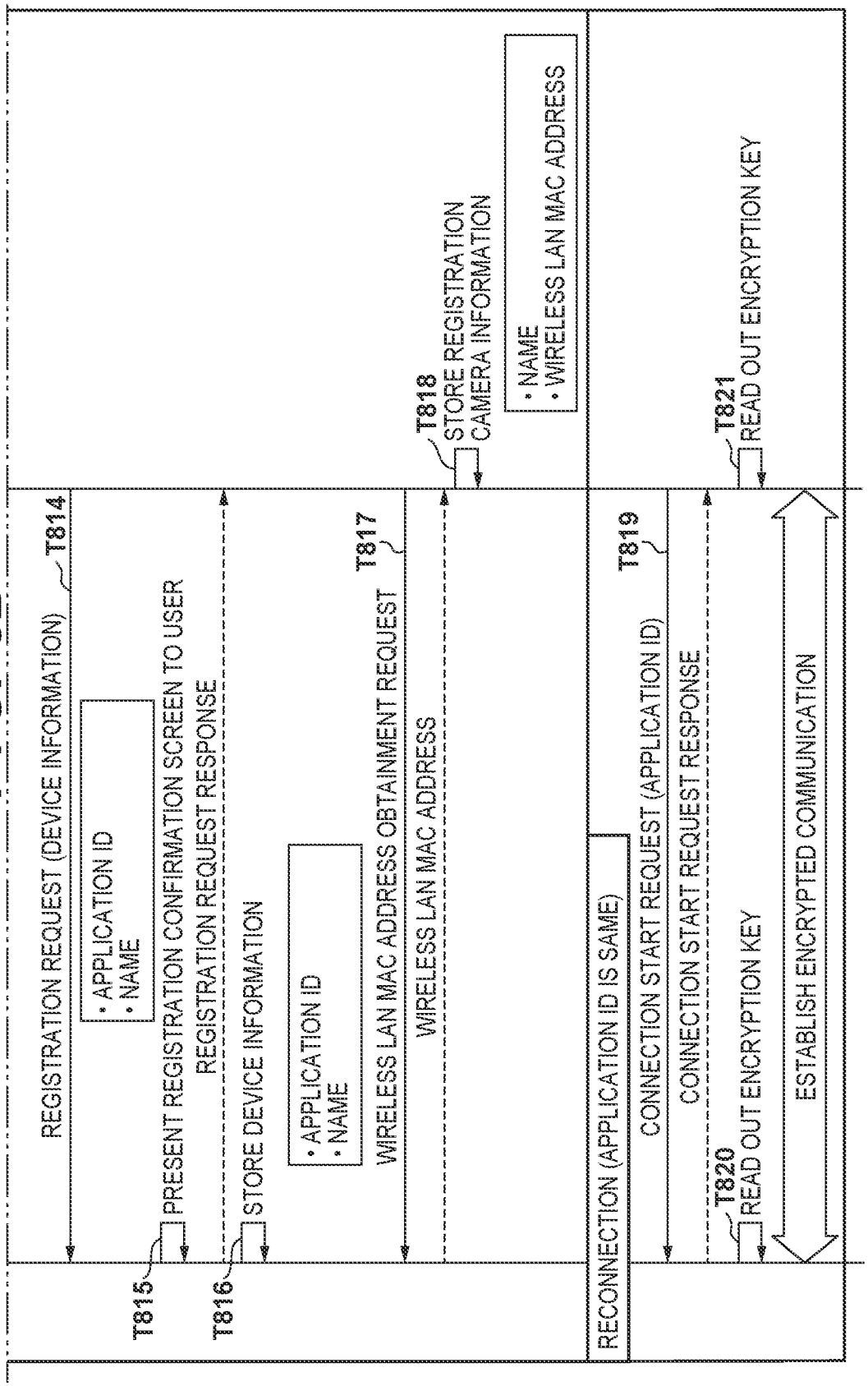

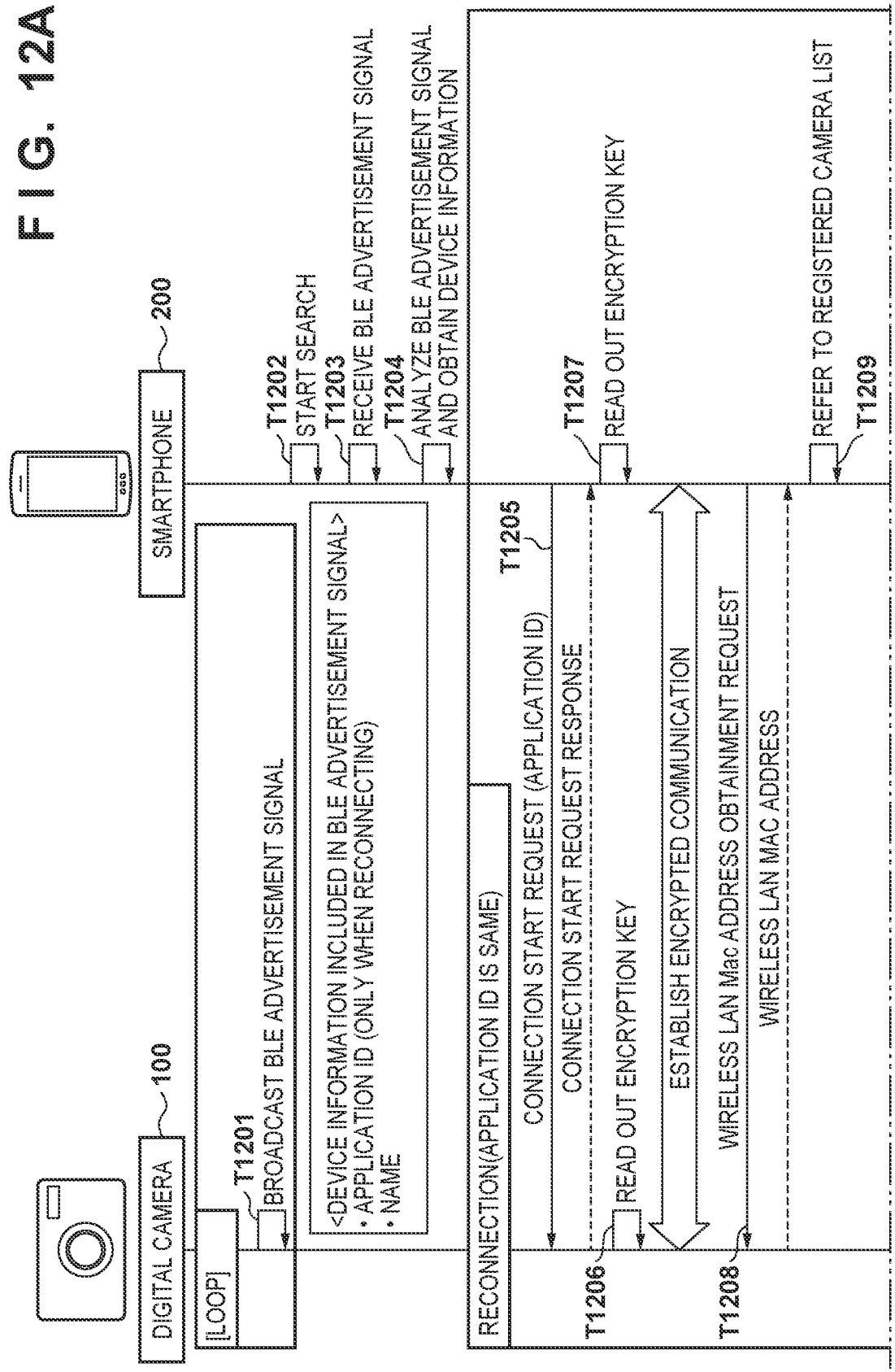

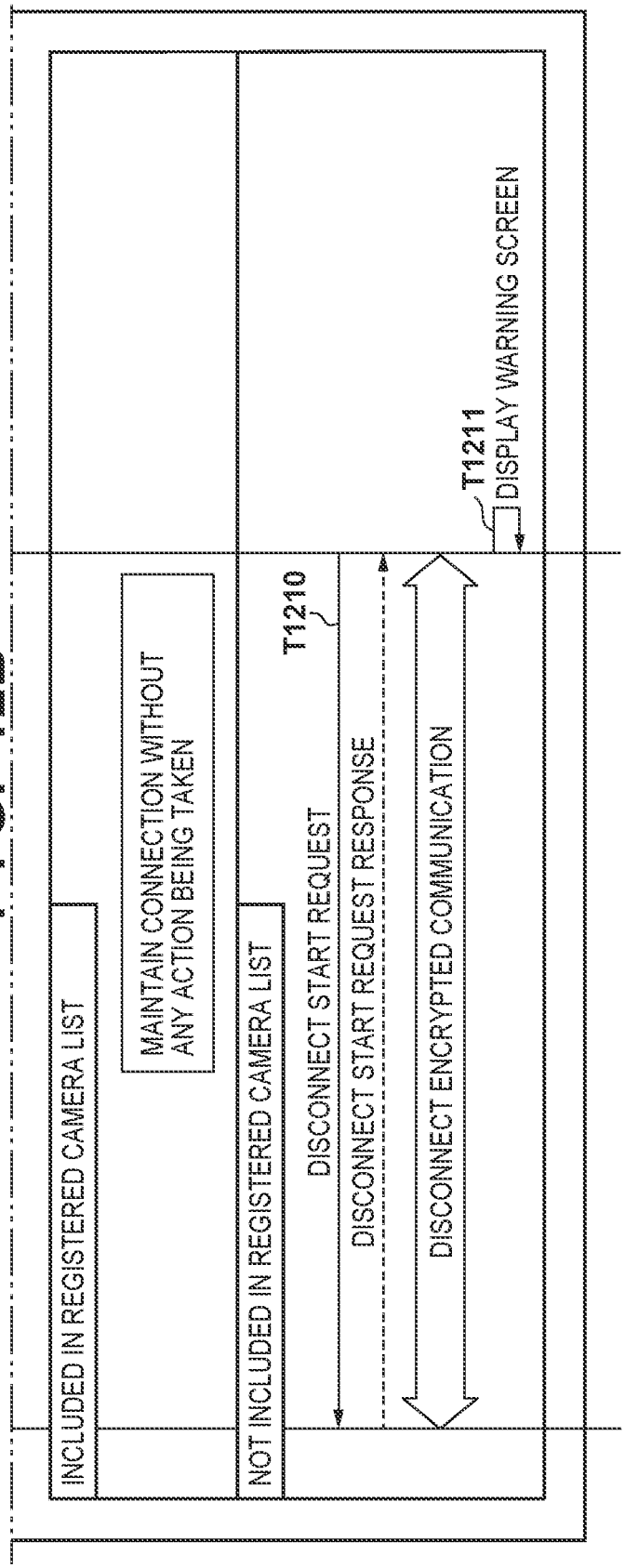

FIG. 14

| INDEX | IDENTIFICATION INFORMATION |
|---|---|
| 1 | 11-22-33-44-55-66 |
| 2 | 12ab34cd56ef |
| 3 | 12-34-56-78-90-12 |

1401, 1402

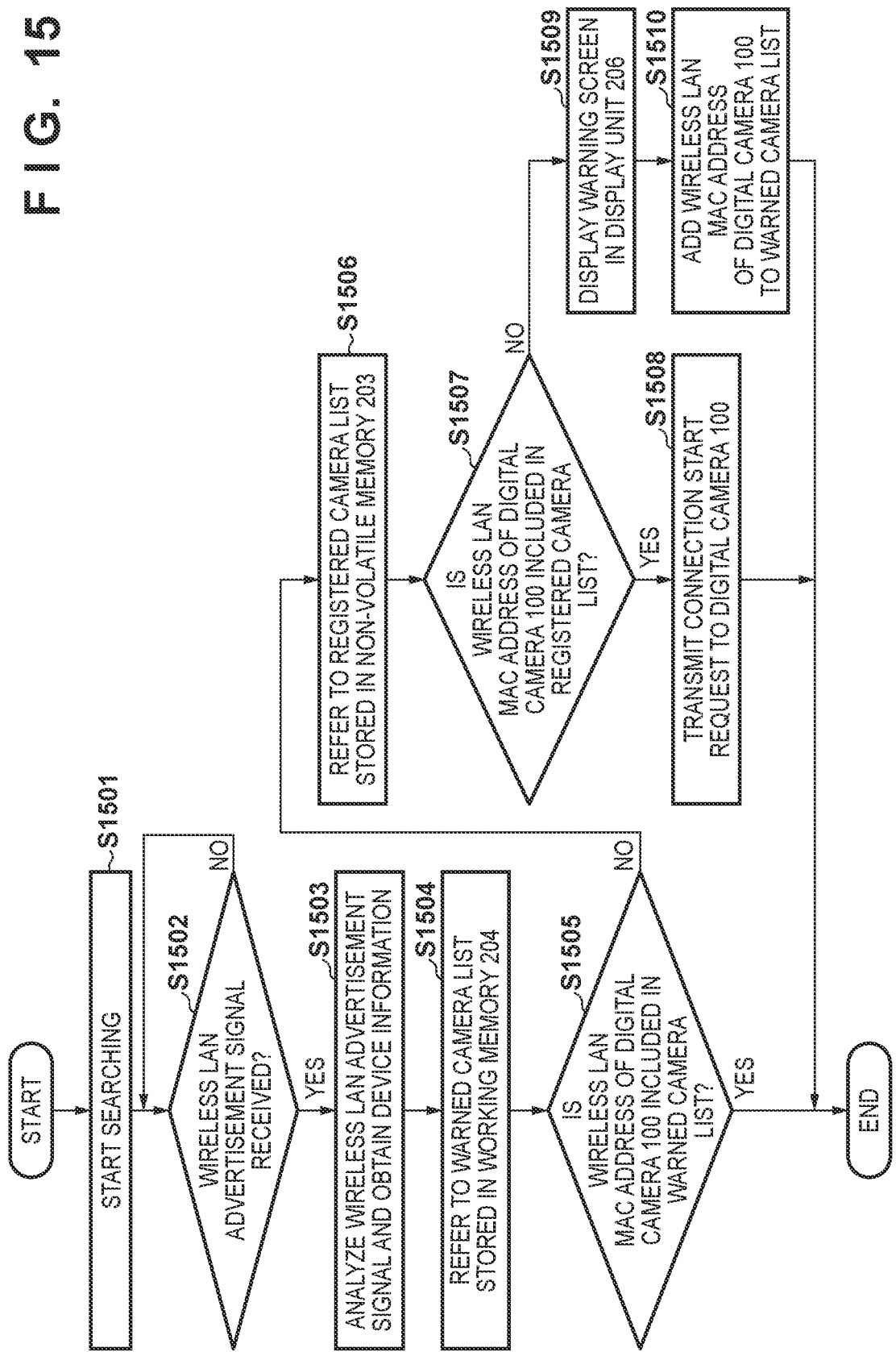

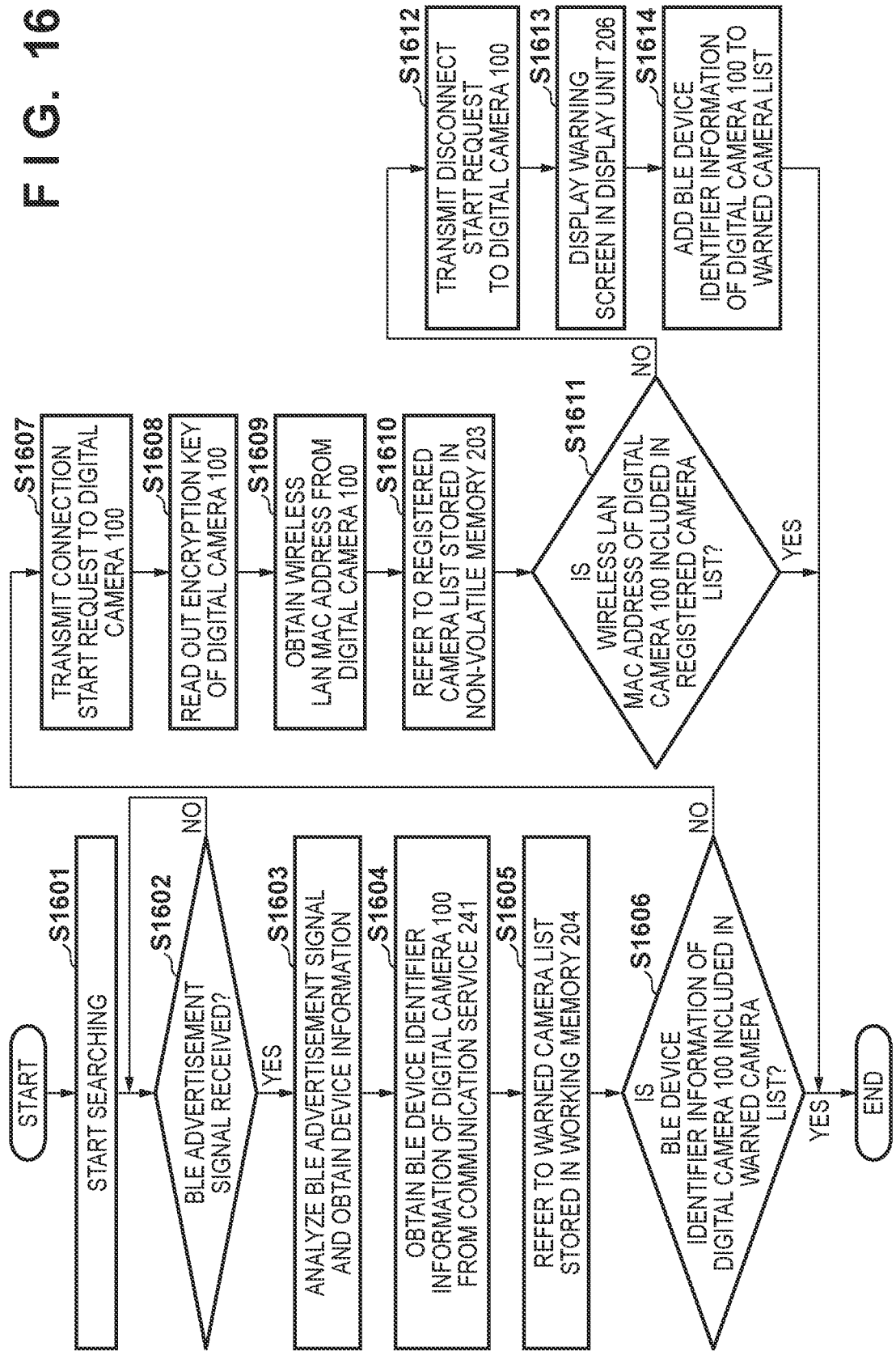

COMMUNICATION DEVICE AND CONTROL METHOD FOR REGISTRATION AND OBTAINING IDS

BACKGROUND OF THE INVENTION

Field of the Invention

The present invention relates to a communication device and a control method thereof, and particularly relates to a communication device that supports a plurality of communication standards, and to a control method thereof.

Description of the Related Art

Registering information about external devices with which a connection has been established, and then using the information to reconnect, enables to execute operations depending on the reconnected external device. However, if the information about the external device requesting reconnection has been deleted, the operations depending on the external device can no longer be executed. In this case, it is necessary to have the external device transmit a new connection request instead of a reconnection request in order to register the information about the external device again.

Therefore, when a reconnection request is received from an external device, whether information about that external device is present (whether the external device is still registered or has been deleted) should be determined, and if such information is present, a warning should be issued to a user to transmit a new connection request. To determine whether information about the external device that transmitted the reconnection request is present, unique information (identification information) of the external device is necessary.

On the other hand, the timing at which the identification information of an external device can be obtained depends on the communication standard. Therefore, with a communication device capable of establishing connections conforming to a plurality of communication standards with external devices, such as that described in Japanese Patent Laid-Open No. 2021-78002, it is necessary to perform an appropriate determination operation in accordance with the communication standard to which the reconnection request pertains. However, a communication device capable of executing such a determination operation has thus far not been known.

SUMMARY OF THE INVENTION

The present invention in one aspect provides a communication device that supports a plurality of communication standards, which, upon receiving a reconnection request from an external device, can determine whether information about the external device is stored, using a method according to the communication standard to which the reconnection request pertains.

According to an aspect of the present invention, there is provided a communication device comprising: a first communication circuit capable of establishing a connection with an external device in accordance with a first communication standard; a second communication circuit capable of establishing a connection with an external device in accordance with a second communication standard; a storage device that stores information about one or more external devices registered in an application that uses communication with an external device; and one or more processors that execute a program stored in a memory and thereby function as: a control unit configured to, when a reconnection request is received from an external device through the first communication circuit or the second communication circuit, output a warning if a registration of the external device in the application has been deleted, wherein the control unit determines whether the registration of the external device in the application has been deleted based on identification information of the external device, the identification information being obtained through different procedures depending on through which of the first communication circuit and the second communication circuit the reconnection request has been received.

According to another aspect of the present invention, there is provided a control method executed by a communication device, the communication device including: a first communication circuit capable of establishing a connection with an external device in accordance with a first communication standard; a second communication circuit capable of establishing a connection with an external device in accordance with a second communication standard; and a storage device that stores information about one or more external device registered in an application that uses communication with an external device, wherein the control method comprises, when a reconnection request has been received from an external device through the first communication circuit or the second communication circuit: obtaining identification information of the external device through different procedures depending on through which of the first communication circuit and the second communication circuit the reconnection request has been received; determining whether a registration of the external device in the application has been deleted based on the identification information; and outputting a warning in a case where the registration of the external device in the application is determined to have been deleted.

According to a further aspect of the present invention, there is provided a non-transitory computer-readable medium having stored therein a program which, when executed by a computer having a communication device, causes the computer to execute a method, wherein the communication device comprises: a first communication circuit capable of establishing a connection with an external device in accordance with a first communication standard; a second communication circuit capable of establishing a connection with an external device in accordance with a second communication standard; and a storage device that stores information about one or more external devices registered in an application that uses communication with an external device, and wherein the method comprising, when a reconnection request has been received from an external device through the first communication circuit or the second communication circuit: obtaining identification information of the external device through different procedures depending on through which of the first communication circuit and the second communication circuit the reconnection request has been received; determining whether a registration of the external device in the application has been deleted based on the identification information; and outputting a warning in a case where the registration of the external device in the application is determined to have been deleted.

Further features of the present invention will become apparent from the following description of exemplary embodiments (with reference to the attached drawings).

BRIEF DESCRIPTION OF THE DRAWINGS

FIG. 6 is a diagram illustrating an example of a registered camera list used in embodiments.

FIGS. 7A and 7B are sequence charts pertaining to wireless LAN connection operations between the digital camera and the smartphone according to embodiments.

FIGS. 8A and 8B are sequence charts pertaining to BLE connection operations between the digital camera and the smartphone according to embodiments.

FIGS. 12A and 12B are sequence charts pertaining to BLE reconnection operations between the digital camera and the smartphone according to embodiments.

FIG. 14 is a diagram illustrating an example of a warned camera list used in a second embodiment.

FIG. 15 is a flowchart pertaining to operations by the digital camera upon receiving a wireless LAN reconnection request, according to the second embodiment.

FIG. 16 is a flowchart pertaining to operations by the digital camera upon receiving a BLE reconnection request, according to the second embodiment.

DESCRIPTION OF THE EMBODIMENTS

Figure 1:
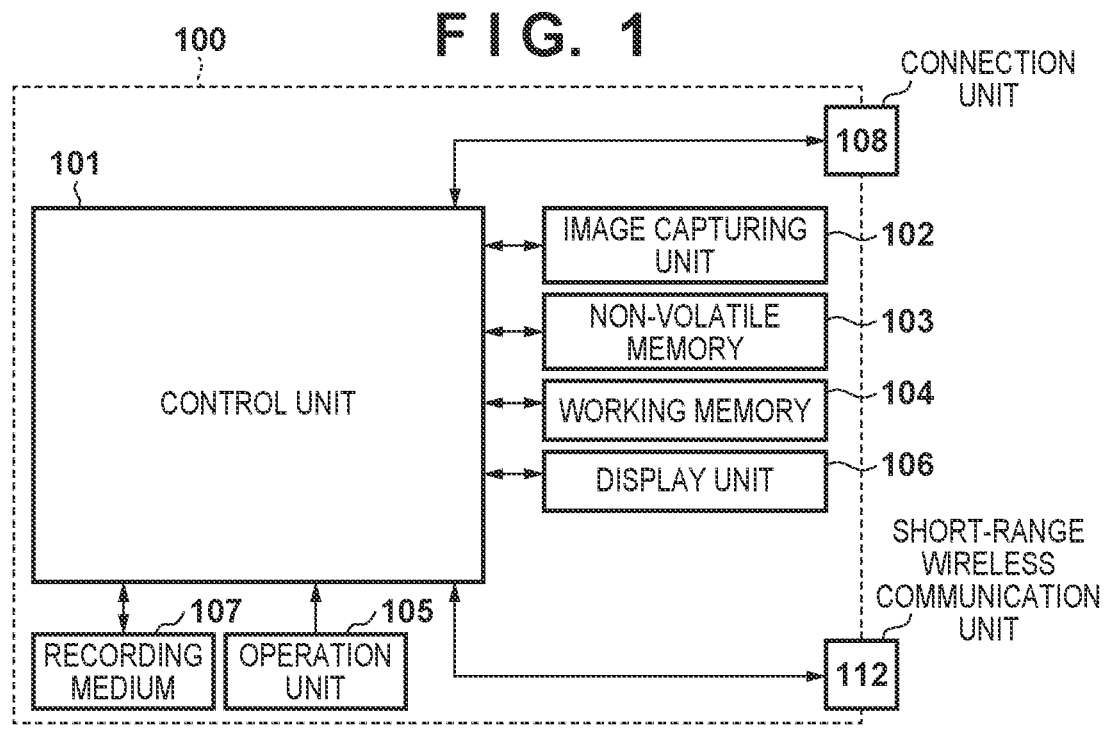
FIG. 1 is a block diagram illustrating an example of the functional configuration of a digital camera serving as an example of an external device according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiments will describe a case where the present invention is applied in the smartphone. However, the present invention can be applied in any electronic device that supports a plurality of communication standards. Such an electronic device includes a computer device (a personal computer, a tablet computer, a media player, a PDA, or the like), a game console, an image capturing device, or the like. These are merely examples, however, and the present invention can be applied in other electronic devices as well.

First Embodiment

Example of Configuration of Digital Camera

FIG. 1 is a block diagram illustrating an example of the functional configuration of a digital camera 100 serving as an example of an external device. The external device may be any electronic device capable of communicating with a smartphone in accordance with one or more communication standards. Such an electronic device includes a computer device (a personal computer, a tablet computer, a media player, a PDA, or the like), a game console, or the like.

A control unit 101 includes one or more processors ("CPUs" hereinafter) capable of executing programs, and loads programs stored in, for example, a non-volatile memory 103 into a working memory 104 and executes the programs. The control unit 101 realizes the functions of the digital camera 100 by executing programs to control the operations of the various function blocks.

The non-volatile memory 103, which may be rewritable, stores programs which can be executed by the CPU of the control unit 101, setting values for the digital camera 100, GUI data, and the like. The non-volatile memory 103 also stores information pertaining to external devices which have been communicated with.

Note that the operations of the digital camera 100 (described later) are assumed to be realized by executing programs stored in the non-volatile memory 103.

The working memory 104 is, for example, volatile memory, and is used to load programs to be executed by the CPU of the control unit 101, store values needed during the execution of the programs, and the like. Note that part of the working memory 104 may be used as display memory for a display unit 106.

An image capturing unit 102 is a camera unit having an imaging optical system, an image sensor, and the like. The image capturing unit 102 captures images under the control of the control unit 101, and stores the resulting image data in the working memory 104. The control unit 101 generates an image data file by applying predetermined image processing to the image data. The control unit 101 records the image data file into a recording medium 107, for example. The control unit 101 also generates image data for display by applying predetermined image processing to the image data. The control unit 101 stores the image data for display in a video memory region of the working memory 104, composites that data with an image indicating information such as the current setting values, and displays the result in the display unit 106.

The display unit 106 can be caused to function as an electronic viewfinder (EVF) by shooting a moving image using the image capturing unit 102 and immediately displaying the shot moving image in the display unit 106. The moving image displayed when the display unit 106 is caused to function as an EVF is called a "live view image".

"Operation unit 105" is a collective name for input devices provided in the digital camera 100. The operation unit 105 can include a touch panel provided on the display unit 106, a power switch, a shutter button, a moving image shooting button, a directional key, a set button, a menu button, and the like, but is not limited thereto. Upon detecting an operation made on the operation unit 105, the control unit 101 executes operations according to the detected operation.

The display unit 106 is used to display images shot by the image capturing unit 102, images recorded in the recording medium 107, menu screens, and the like. Note that the configuration may be such that an external display device can be connected to the digital camera 100.

The recording medium 107 is provided separate from the non-volatile memory 103, and may be a semiconductor memory card, for example. The recording medium 107 is used as a recording location for the image data files generated by the control unit 101, for example.

A connection unit 108 is a communication interface. The connection unit 108 communicates with an external device through communication conforming to at least one of publicly-known wired and wireless communication standards, including a wireless communication standard. The connection unit 108 includes circuitry (antennas, connectors, transmitters/receivers, and the like) according to the communication standard to which the unit conforms.

A short-range wireless communication unit 112 is another communication interface. The short-range wireless communication unit 112 communicates with external devices through communication conforming to one or more publicly-known short-range wireless communication standards. The short-range wireless communication unit 112 includes circuitry (antennas, transmitters/receivers, and the like) according to the communication standard to which the unit conforms.

For the sake of convenience, it is assumed here that the connection unit 108 and the short-range wireless communication unit 112 conform to mutually-different wireless communication standards. It is furthermore assumed that the connection unit 108 conforms to a communication standard providing a broader communication range and a faster communication speed than that of the short-range wireless communication unit 112, and requires a greater amount of power for operations than the short-range wireless communication unit 112. The combination of communication standards to which the connection unit 108 and the short-range wireless communication unit 112 conform is not particularly limited as long as the aforementioned relationship is satisfied.

In the present embodiment, the digital camera 100 communicates with a connection unit 208 and a short-range wireless communication unit 212 of the smartphone 200 (described later). It is therefore assumed that the connection units 108 and 208 conform to the same communication standard, and that the short-range wireless communication units 112 and 212 conform to the same communication standard.

The following will assume, as an example, that the connection units 108 and 208 are wireless communication interfaces which conform to the wireless LAN (IEEE 802.11 series) standard. It is also assumed that the short-range wireless communication units 112 and 212 are wireless communication interfaces which conform to a Bluetooth (registered trademark) version 4.0 or later standard, and Bluetooth Low Energy (BLE) in particular.

Note that the connection unit 108 and the short-range wireless communication unit 112 may share some circuitry.

Additionally, the connection unit 108 communicates with the connection unit 208 in infrastructure mode, and therefore functions as an access point (AP). In other words, the connection unit 108 has a function for forming a network to which the smartphone 200 can connect. However, it is assumed that the connection unit 108 functions as a simple AP which does not have a gateway function for transferring data received from an external device connected to the network the connection unit 108 itself formed to another network. The connection unit 108 can also connect to other APs instead of functioning as a simple AP.

Example of Configuration of Smartphone

Figure 2A:
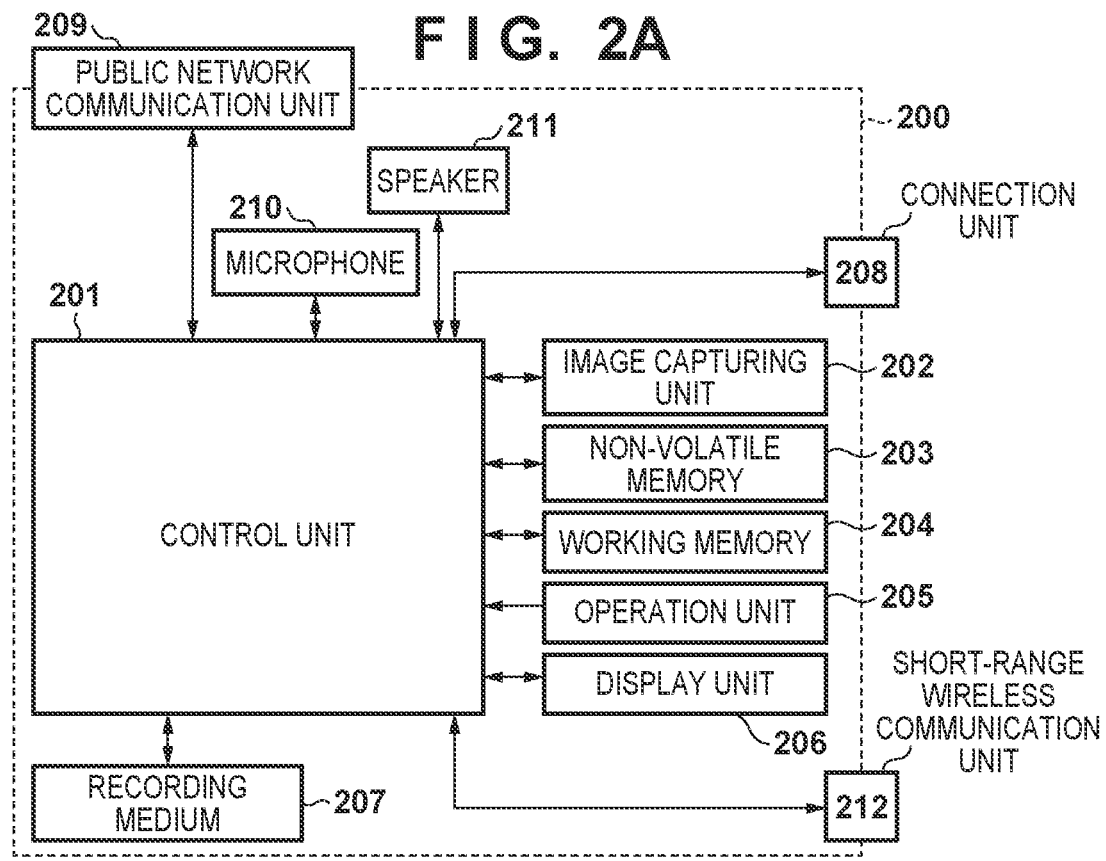
FIGS. 2A and 2B are block diagrams illustrating an example of the functional configuration of a smartphone serving as a communication device according to embodiments.

FIG. 2A is a block diagram illustrating an example of the functional configuration of the smartphone 200 serving as an example of a communication device according to the embodiment. The smartphone 200 may be any electronic device capable of communicating with the connection unit 108 and the short-range wireless communication unit 112 of the digital camera 100, which serves as an external device.

A control unit 201 includes one or more processors ("CPUs" hereinafter) capable of executing programs, and loads program stored in, for example, a non-volatile memory 203 into a working memory 204 and executes the programs. The control unit 201 implements the functions of the smartphone 200 by executing programs to control the operations of the function blocks.

The non-volatile memory 203, which may be rewritable, stores programs (an operating system (OS), applications, and the like) that can be executed by the CPU of the control unit 201, setting values for the smartphone 200 and the applications, user data, and the like. Additionally, as will be described later, the smartphone 200 stores information pertaining to external devices communicated with and information necessary for restarting communication with external devices communicated with in the non-volatile memory 203.

It is assumed that the operations of the smartphone 200 (described later) are realized by executing applications stored in the non-volatile memory 203. Note that it is not necessary for an application to include programs for realizing all the functions thereof, and functions provided by the OS can be used as appropriate. For example, the OS can provide basic functions pertaining to wireless communication with external devices which conform to specific wireless communication standards, such as confirming the presence/absence of external devices, establishing and terminating wireless connections (links) with external devices, and the like.

The working memory 204 is, for example, volatile memory, and is used to load programs to be executed by the CPU of the control unit 201, store values needed during the execution of the programs, and the like. Note that part of the working memory 204 may be used as display memory for a display unit 206.

An image capturing unit 202 is a camera unit having an imaging optical system, an image sensor, and the like. The image capturing unit 202 captures images under the control of the control unit 201, and stores the resulting image data in the working memory 204. The control unit 201 generates an image data file by applying predetermined image processing to the image data. The control unit 201 records the image data file into a recording medium 207, for example.

"Operation unit 205" is a collective name for input devices provided in the smartphone 200. The operation unit 205 can include a touch panel provided on the display unit 206, a power switch, volume adjustment buttons, and the like, but is not limited thereto. Upon detecting an operation made on the operation unit 205, the control unit 201 executes operations according to the detected operation.

The display unit 206 is a touchscreen. The display unit 206 displays screens provided by the OS, applications, and the like. The configuration may be such that an external display device can be connected to the smartphone 200.

The recording medium 207 is provided separate from the non-volatile memory 203, and may be a semiconductor memory card, for example. The recording medium 207 is used as a recording location for image data files generated by the control unit 201, data downloaded by a user, and the like, for example. Note that the recording medium 207 may be used as part of the non-volatile memory 203 (to expand the capacity of the non-volatile memory 203).

The connection unit 208 (a second communication circuit) is a communication interface. The connection unit 208 communicates with an external device through communication conforming to at least one of publicly-known wired and wireless communication standards, including a wireless communication standard. The connection unit 208 includes circuitry (antennas, connectors, transmitters/receivers, and the like) according to the communication standard to which the unit conforms.

The short-range wireless communication unit 212 (a first communication circuit) is also a communication interface. The short-range wireless communication unit 212 communicates with external devices through communication conforming to one or more publicly-known short-range wireless communication standards. The short-range wireless communication unit 212 includes circuitry (antennas, transmitters/receivers, and the like) according to the communication standard to which the unit conforms.

As described above, it is assumed here that the connection unit 208 is a wireless communication interface which conforms to a wireless LAN (IEEE 802.11 series) standard. It is furthermore assumed that the short-range wireless communication unit 212 is a wireless communication interface which conforms to Bluetooth Low Energy (BLE).

A public network communication unit 209 is a communication interface for a mobile communication network, and conforms to one or more communication standards established by the Third Generation Partnership Project (3GPP), for example (3G, 4G, 5G, or the like).

Note that the connection unit 208, the short-range wireless communication unit 212, and the public network communication unit 209 may share some circuitry.

A microphone 210 is used for voice calls and to input voice commands. The microphone 210 is included in the operation unit 205 as a voice command input device.

A speaker 211 is used for voice calls, playing back audio, and the like.

Figure 2B:
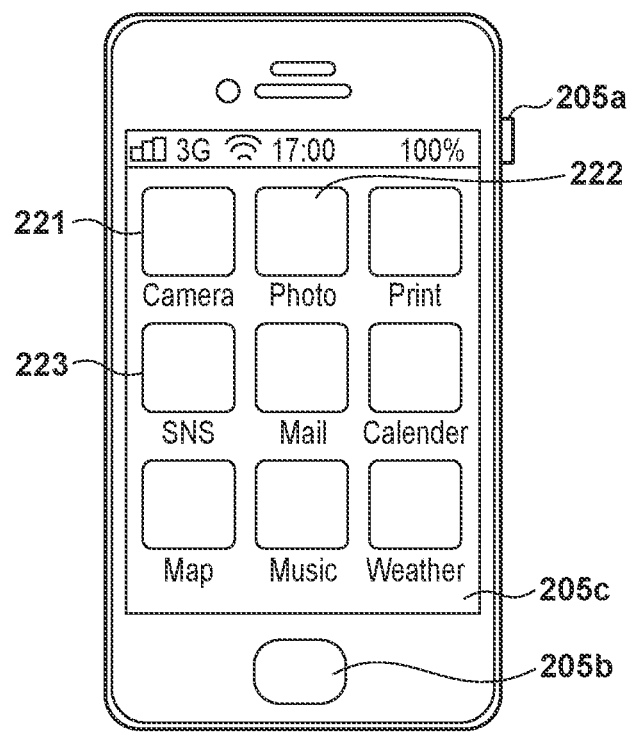

FIG. 2B is a diagram illustrating an example of the external appearance of the smartphone 200. A power button 205a, a home button 205b, and a touch panel 205c are input devices included in the operation unit 205. When the home button 205b is pressed, the control unit 201 interrupts the execution of applications and displays a home screen in the display unit 206.

Items (e.g., icons) corresponding to applications are arranged in the home screen of the smartphone 200. From the home screen, applications can be launched and applications running in the background can be called to the foreground.

Here, an item 221 is an item for a camera communication application that provides a function which uses communication between the smartphone 200 and the digital camera 100. An item 222 is an image application item for viewing and editing images stored in the smartphone 200. An item 223 is an item for a social networking service (SNS) application that communicates with a server to share images, text, and the like with other users.

The present embodiment assumes that the camera communication application is provided by the manufacturer of the digital camera 100 and is installed through an app distribution site. The SNS application is assumed to be provided by a third party and installed through an app distribution site. On the other hand, the image application is assumed to be pre-installed as a standard app in the smartphone 200. It is assumed that whether individual applications are pre-installed or installed through an app distribution site is stored in the non-volatile memory 203, for example.

When an operation (e.g., touch operation) on an item is detected, the control unit 201 checks the state of the application corresponding to the operated item. If the application is not running or needs to be launched, the control unit 201 launches the application. On the other hand, if the application is running in the background (is inactive) and does not need to be launched, the control unit 201 moves the application to the foreground (the frontmost screen) (i.e., activates the application). This causes a screen of the application to be displayed in the display unit 206.

Aside from items being operated, the smartphone 200 can also change the state of the application through operations for switching applications performed according to the OS. Specifically, the application can be switched between being in the background (inactive) and in the foreground (active). If necessary, the control unit 201 launches the application switched from the background to the foreground. Note that the application may continue to perform some functions even after transitioning to the background (inactive).

Overview of Connection Format

Figure 3A:
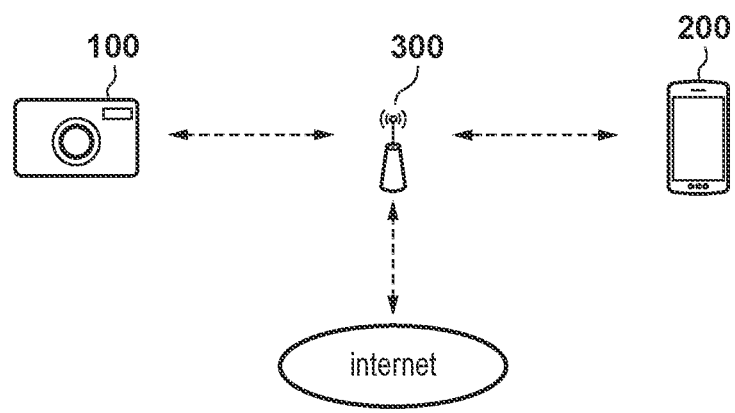
FIGS. 3A and 3B are schematic diagrams illustrating an example of the configuration of a communication system according to embodiments.
Figure 3B:

FIGS. 3A and 3B are diagrams schematically illustrating a connection format between the digital camera 100 and the smartphone 200. In the present embodiment, the digital camera 100 and the smartphone 200 can establish a connection in the two formats illustrated in FIGS. 3A and 3B.

FIG. 3A illustrates a format in which the digital camera 100 and the smartphone 200 join a wireless LAN network formed by an external AP 300, which is an example of a relay device. The digital camera 100 and the smartphone 200 detect beacon signals transmitted periodically by the external AP 300, and join the wireless LAN network formed by the external AP 300. By joining the same wireless LAN network, the digital camera 100 and the smartphone 200 recognize each other, establish a connection by performing a predetermined procedure, and enter a state of being able to communicate with each other over the wireless LAN network.

The external AP 300 can be connected to an external network such as the Internet through a public network or the like. As such, the smartphone 200 can transmit data to devices on the Internet via the external AP 300.

FIG. 3B illustrates a format in which the digital camera 100 and the smartphone 200 are connected directly, without going through a relay device. This format is used when the connection unit 108 of the digital camera 100 functions as a simple AP and the short-range wireless communication units communicate using BLE. Note that the present embodiment assumes that a wireless LAN ad hoc mode is not used.

When a BLE connection is established between the smartphone 200 and digital camera 100 in the present embodiment, the smartphone 200 is assumed to act as a central device (a parent device), and the digital camera 100 is assumed to act as a peripheral device (a child device). Accordingly, the digital camera 100 periodically transmits a BLE advertisement signal from the short-range wireless communication unit 112. The smartphone 200 executes a scanning operation using the short-range wireless communication unit 212 and receives the BLE advertisement signal transmitted by the digital camera 100.

The smartphone 200 recognizes the presence of the digital camera 100 by receiving the BLE advertisement signal. The smartphone 200 then transmits a connection request to the digital camera 100. Procedures such as exchanging encryption keys and the like are then performed, and once the BLE connection is established, the devices can communicate over the BLE connection.

When the connection unit 108 of the digital camera 100 functions as a simple AP, the connection unit 108 transmits a beacon signal periodically. The smartphone 200 detects the presence of the digital camera 100 by receiving a beacon signal through the connection unit 208. The smartphone 200 then transmits a request to join the wireless LAN network generated by the connection unit 108 of the digital camera 100. A connection between the devices is then established by executing a predetermined procedure, whereupon the devices become able to communicate with each other.

The digital camera 100 does not have a function for communicating with an external network such as the Internet. Accordingly, when joining the wireless LAN network formed by the digital camera 100, the smartphone 200 cannot transmit data to an external network such as the Internet.

Software Configuration of Smartphone 200

Figure 4:
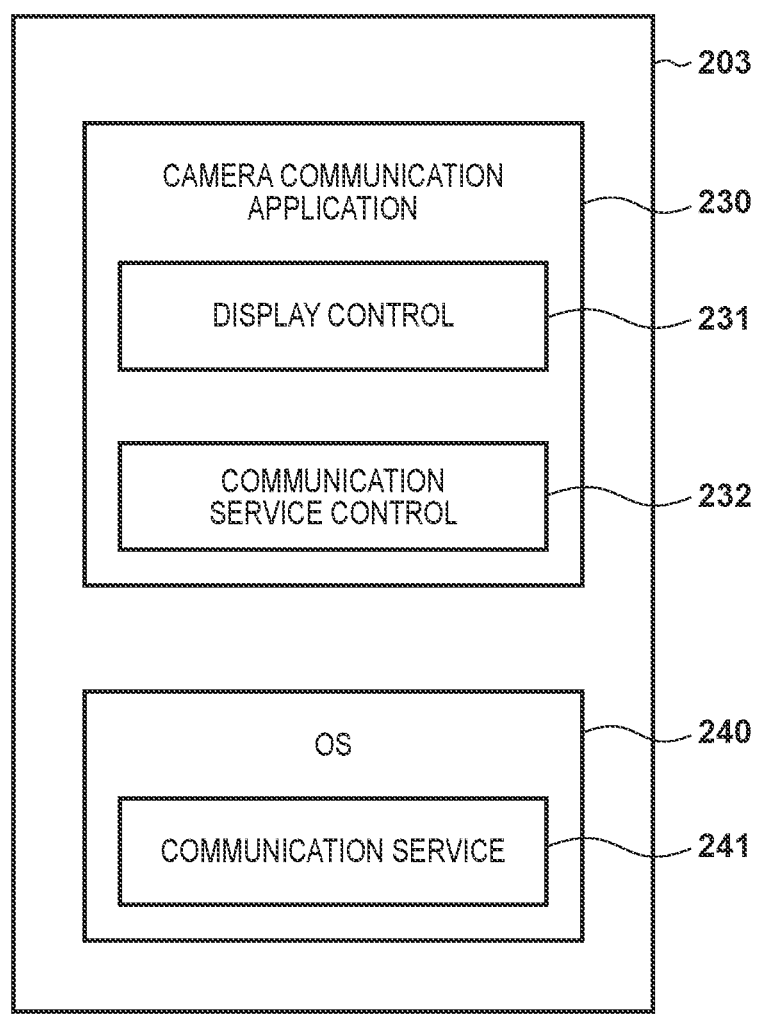
FIG. 4 is a diagram illustrating an example of the software configuration of the smartphone according to embodiments.

An example of the software configuration of the smartphone 200 will be described next with reference to FIG. 4. Various programs executed by the control unit 201 are stored in the non-volatile memory 203 of the smartphone 200. FIG. 4 illustrates an operating system (OS) 240, as well as a camera communication application 230 serving as a representative example of application software. The camera communication application provides functions which use communication between the digital camera 100 and the smartphone 200. In actuality, the applications installed as standard applications in the smartphone 200 and user-installed applications are stored in the non-volatile memory 203.

When the user turns on the power switch included in the operation unit 205 of the smartphone 200, the smartphone 200 starts up, and the control unit 201 reads out the OS 240 from the non-volatile memory 203, expands the OS 240 in the working memory 204, and executes the OS 240. The control unit 201 also controls the various units in the smartphone 200 by executing the OS 240 and the installed applications.

The OS 240 provides the basic functions of the smartphone 200 to the user, and also provides various services to applications. FIG. 4 illustrates a communication service 241 as a representative example of the plurality of services provided by the OS to the applications.

The communication service 241 provides functions such as turning functions on and off (activating/deactivating), generating and managing encryption keys required for communication, establishing connections with external devices, and communicating with connected external devices, for each type of communication function (communication standard) supported by the smartphone 200. The communication service 241 also provides applications with data obtained from external devices through communication, provides a function for transmitting and receiving data to and from external devices in response to requests from applications, and the like.

The camera communication application 230 includes various function modules. A display control module 231, which generates screens to be displayed in the display unit 206, and a communication service control module 232, which provides functions for using communication with the digital camera 100 through the communication service 241 provided by the OS 240, are given as representative examples.

Information necessary for communication with external devices, such as BLE pairing information, is managed by the communication service 241 of the OS 240, and therefore cannot be deleted from the camera communication application 230. Deleting information managed by the OS 240 requires the use of a dedicated application such as a settings application, for example.

On the other hand, the camera communication application 230 manages a registered camera list (described later). As such, camera information can be deleted from the registered camera list through the camera communication application 230. Even if camera information is deleted from the registered camera list, the information necessary for communication with the digital camera corresponding to the deleted camera information is still managed by the OS 240, and will not be automatically deleted.

Description of Menu Screens of Camera Communication Application 230

FIGS. 5A to 5D are diagrams illustrating examples of menu screens provided by the camera communication application 230 when in the foreground. The camera communication application 230 in the present embodiment is assumed to store information on digital cameras that have established connections with the smartphone 200 and provide a menu screen for each stored digital camera. If a plurality of digital cameras are stored, the user can switch the menu screen to display the menu screen of the desired digital camera to be used through the camera communication application 230.

An example of screens generated by the display control module 231 and displayed in the display unit 206 when the control unit 201 executes the camera communication application 230 will be described hereinafter with reference to FIGS. 5A to 5D.

Figure 5A:
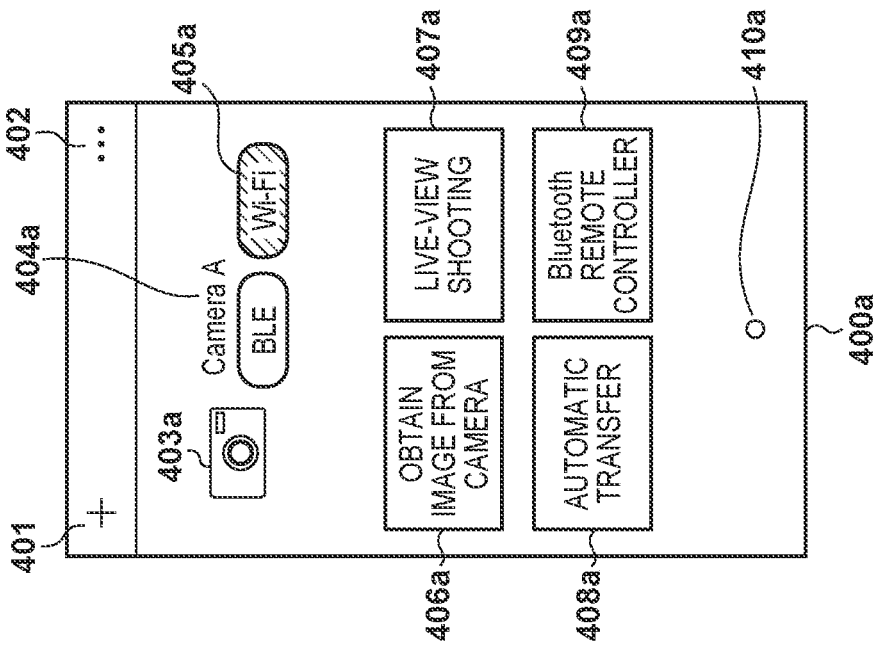
FIGS. 5A to 5D are diagrams illustrating examples of screens of a camera communication application according to embodiments.

FIG. 5A illustrates an example of a menu screen 400 displayed when not even one digital camera is registered when the camera communication application 230 is launched. The menu screen 400 has a register camera button 401 and a confirm registration button 402.

When the register camera button 401 is pressed, the control unit 201 executes a digital camera registration operation. When the registration is complete, the control unit 201 generates a menu screen for the registered digital camera and displays that screen in the display unit 206. Operations by the smartphone 200 and the digital camera 100 during digital camera registration will be described in detail later.

When the confirm registration button 402 is pressed, the control unit 201 displays a list of digital camera information registered in the camera communication application 230 in the display unit 206.

Figure 5B:
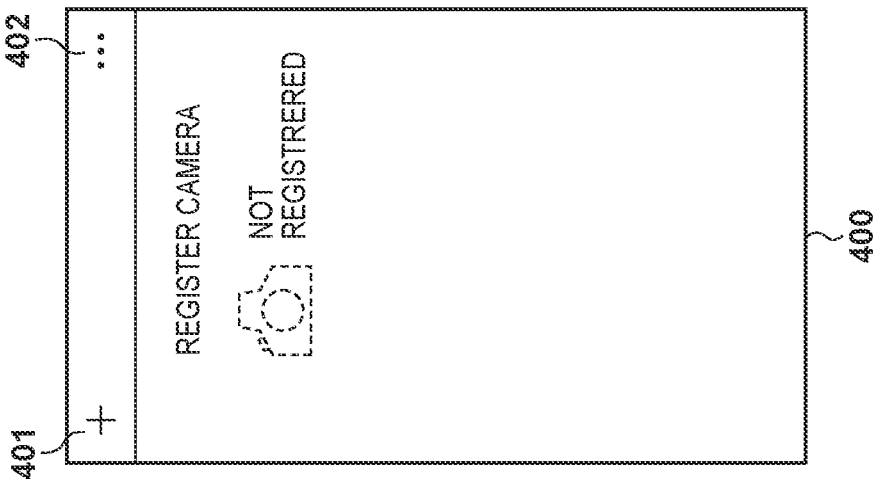

FIG. 5B illustrates an example of a menu screen 400a displayed when a connection is currently established between an already-registered digital camera and the smartphone 200 when the camera communication application 230 is launched. It is assumed here that a connection has already been established between a digital camera (name: Camera A), which is already registered in the camera communication application 230, and the smartphone 200. The menu screen 400a is therefore a menu screen for Camera A. Both Camera A and Camera B (described later) are assumed to have the same functional configuration as the digital camera 100.

The menu screen 400a displays, for example, an icon 403a indicating the external appearance, a name 404a (Camera A), and a connection method 405a as the information on the connected Camera A. Here, icons are listed for each method (communication standard name) by which the smartphone 200 and Camera A can be connected, and if a connection is currently established, the icon is displayed brighter than if no connection is established. Note that another display method may be used, such as indicating only the method by which the connection is established. The example in FIG. 5B indicates that a BLE connection is currently established between the smartphone 200 and Camera A, but a Wi-Fi connection is not established.

In the present embodiment, information necessary to establish a connection by the connection units 208 and 108 (e.g., identification information, a password or encryption key, address information, or the like) can be obtained from the digital camera 100 through the connection made by the short-range wireless communication units 212 and 112. Switching the communication interface used for communication with the same external device between the short-range wireless communication unit 112 and the connection unit 108 will be called a "handover" here.

A wireless LAN connection is required for functions executed in response to function buttons 406a to 408a (described later) being pressed. However, handover to a wireless LAN connection is possible if a connection is already established over BLE. The function buttons 406a to 408a are therefore displayed as enabled functions in the menu screen 400a. If a handover is not possible, the function buttons 406a to 408a are displayed as disabled functions.

Function buttons 406a to 409a correspond to functions that the camera communication application 230 can provide for Camera A. The functions described here are merely examples, and the type and number of functions can vary depending on the camera communication application 230 and the digital camera.

Any functions may be applied as long as the functions are related to the already-registered digital camera, such as a function for changing the settings of the digital camera, a function for connecting to an external website where the instruction manual of the digital camera can be viewed, or the like, for example. The number and types of function buttons displayed in the menu screen may vary depending on the digital camera.

The function button 406a is a button for executing a function for obtaining an image recorded in the recording medium 107 from Camera A and displaying the image in the display unit 206.

The function button 407a is a button for obtaining a live view image from Camera A and using the display unit 206 as an EVF of Camera A.

The function button 408a is a button for setting an automatic transmission function that, when a still image is shot by Camera A, transfers generated image data for recording to the smartphone 200.

The function button 409a is a button for causing the smartphone 200 to function as a remote controller for issuing shooting instructions to Camera A. The remote controller function only outputs shooting instructions, and does not cause the display unit 206 to function as an EVF of Camera A.

It is assumed here that the functions corresponding to the function buttons 406a to 408a are registered in the camera communication application 230 as functions that require communication over wireless LAN when executed. On the other hand, it is assumed that the function corresponding to the function button 409a is registered in the camera communication application 230 as a function that does not require communication over wireless LAN when executed (i.e., can be executed through BLE communication). The relationship between the functions provided by the camera communication application 230 and the communication method required at the time of execution are assumed to be determined in advance according to, for example, the amount of data communicated between the digital camera and the smartphone 200 when executing the function, the type of data, and the like. For example, a function that requires image data to be transmitted from the digital camera to the smartphone 200 can be a function that requires a communication method, among the communication methods supported by the smartphone 200, that is capable of high-speed communication.

The camera communication application 230 determines whether to enable or disable the function buttons according to the connection method between the smartphone 200 and Camera A, and varies the display formats of the function buttons in accordance with the determination.

FIG. 5B illustrates a state in which Camera A and the smartphone 200 have established a connection using BLE, but not using wireless LAN. In this case, the control unit 201 determines that the remote controller function, which does not require communication over the wireless LAN, is to be enabled. As a result, the function button 409a corresponding to the remote controller function is displayed in a format indicating that the function is enabled. Here, function buttons corresponding to enabled functions are assumed to be displayed brighter than function buttons corresponding to disabled functions.

On the other hand, the functions corresponding to the function buttons 406a to 408a require communication over wireless LAN when executed and are therefore disabled under the current connection method. However, a wireless LAN connection can be established using the currently-established BLE connection, and thus the control unit 201 also displays the function buttons 406a to 408a in a format indicating that the buttons are enabled.

In the menu screen 400a, a page mark 410a has a number equal to the number of menu screens that can be switched. Only one digital camera is already registered here, and thus one page mark 410a is displayed, which indicates that there is no other menu screen which can be switched to. For example, if there is another menu screen which can be switched to, two page marks 410a will be displayed, one of which is displayed in black. The page mark 410a displayed in black indicates the menu screen currently displayed. The position of the page mark displayed in black among the plurality of page marks 410a indicates the page number of the menu screen being displayed, and corresponds to an index number of the registered camera list described later.

The control unit 201 stores the page number of the menu screen currently displayed in the working memory 204. When the camera communication application 230 transitions from the foreground to the background or is terminated, the control unit 201 stores the page number in the non-volatile memory 203. Through this, the next time the camera communication application 230 is launched, the menu screen can be reproduced in the same state as the previous time.

Figure 5C:
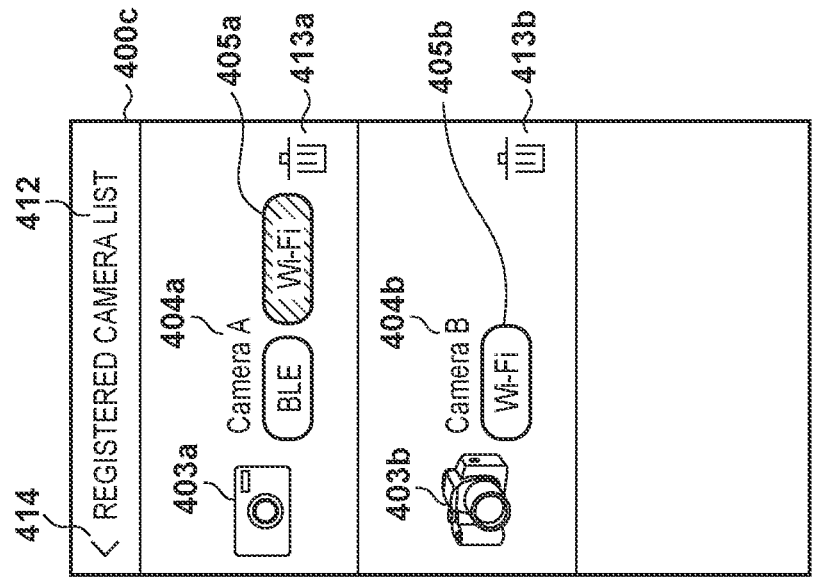

FIG. 5C illustrates an example of a menu screen 400b displayed when the smartphone 200 has established a wireless LAN connection with Camera B when the camera communication application 230 is running. Camera B, which is a digital camera different from Camera A, is assumed to already be registered in the camera communication application 230 in addition to Camera A. Among the items displayed in the menu screen 400b, items having the same reference signs as in FIG. 5B are the same as those in the menu screen 400a, and will therefore not be described.

The menu screen 400b displays, for example, an icon 403b indicating the external appearance, a name 404b (Camera B), and a connection method 405b as the information on the connected Camera B.

Camera B has never established a connection with the smartphone 200 using BLE, and thus BLE is not displayed in the connection method 405b. If a wireless LAN connection has been established, a disconnect button 411b is displayed.

When the disconnect button 411b is pressed, the control unit 201 transmits a disconnect request to Camera B to terminate the wireless LAN connection. Upon receiving the disconnect request, the control unit 101 of Camera B stops the operations of the connection unit 108. This results in the loss of the network generated by the connection unit 108 as a simple AP.

A wireless LAN connection is already established, and thus the control unit 201 determines that the functions corresponding to function buttons 406b to 408b are to be enabled and displays the function buttons 406b to 408b brighter. On the other hand, a BLE connection has not yet been established, and thus the control unit 201 determines that the remote controller function is to be disabled, and displays a function button 409b darker.

Two page marks 410b are displayed, one black and one white. This is because the two Cameras A and B are registered and two pages of menu screens are generated. Of the two page marks 410b, the one on the left is displayed in black and the one on the right in white, which indicates that there is one page corresponding to another menu screen on the right side. Accordingly, if a leftward flick operation is detected on the display unit 206, for example, the control unit 201 switches to the menu screen 400a.

Figure 5D:
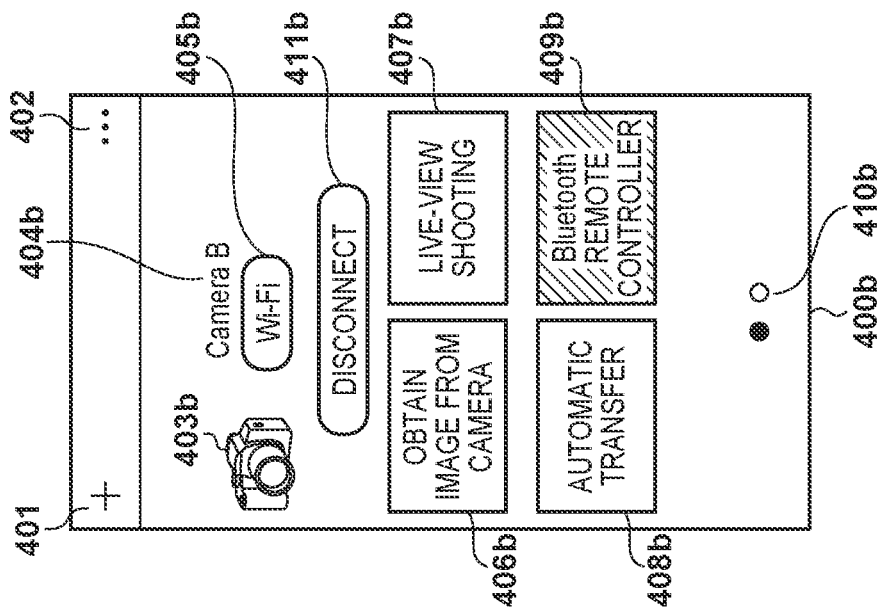

FIG. 5D illustrates an example of a registered camera list screen 400c that displays a list of information about the digital cameras registered with the camera communication application 230. The registered camera list screen 400c is displayed in response to the confirm registration button 402 in the menu screens 400 to 400b being pressed. Here, because Camera A and Camera B are registered, information about Camera A and Camera B is displayed.

The information displayed on each of the already-registered digital cameras is the same as the content displayed in the menu screens for the individual digital cameras, and will therefore not be described. A title character string 412 indicates that the registered camera list screen 400c is being displayed. When a back button 414 is pressed, the control unit 201 returns the display to the screen that had been displayed immediately before the registered camera list screen 400c.

Delete buttons 413a and 413b are displayed for the respective already-registered digital cameras. When the delete button is pressed, the control unit 201 deletes the information of the corresponding digital camera from the registered camera list stored in the non-volatile memory 203. For example, when the delete button 413a is pressed, the control unit 201 deletes the information about Camera A from the registered camera list. The control unit 201 also updates the display of the registered camera list screen 400c such that information about the digital cameras that have been deleted from the registered camera list is not displayed.

Example of Already-Registered External Device List

FIG. 6 is a diagram illustrating an example of a registered camera list as an example of an already-registered external device list in which information obtained from external devices with which the smartphone 200 has established a connection is registered. The registered camera list is stored in the non-volatile memory 203. To simplify the descriptions and facilitate understanding, FIG. 6 illustrates the registered camera list in table format, but the registered camera list may be stored in any format. The camera communication application 230 handles digital cameras for which information is recorded in the registered camera list as already-registered digital cameras.

The camera information includes an index 501, a name 502, and identification information 503 for each camera. Note that other information, such as information on the functions supported by the camera, for example, may be included.

The index 501 is a numerical value indicating an index (consecutive number) of the camera information, and a number is assigned in order from 1.

The name 502 is a character string indicating the name displayed in the menu screen. Note that the name is different from the model name, and is a nickname which can be set for the digital camera by the user.

The identification information 503 is unique information that differs for each individual digital camera. In the present embodiment, a character string indicating the MAC address assigned to the connection unit 108 (the wireless LAN interface) is used as the identification information 503. Note that the identification information 503 may be other information, such as a serial number or the like, as long as it is information that is different for each individual digital camera and can be obtained from the exterior.

The control unit 201 obtains the MAC address of the connection unit 108 and the name in the process of establishing a connection with the digital camera or using an established connection. The method, the timing, and the like for obtaining the camera information differs depending on the connection method (the communication standard), as will be described later.

The control unit 201 compares the identification information obtained from the digital camera 100 (the MAC address) with the identification information 503 in the camera information stored in the non-volatile memory 203. If the identification information obtained from the digital camera 100 is not registered as camera information, the control unit 201 determines that the digital camera 100 has been newly connected. The control unit 201 then adds the name and identification information of the digital camera 100 to the camera information stored in the non-volatile memory 203 along with a new index. In this manner, when a digital camera for which identification information is not stored is connected, the information of that camera is added to the camera information as a new digital camera.

On the other hand, if the identification information obtained from the digital camera 100 is already registered as camera information, the control unit 201 determines that an already-registered digital camera has been reconnected. In this case, the registered camera information need not be updated. However, the name setting for the digital camera 100 may have been changed, and thus the name in the already-registered camera information of the digital camera 100 may be updated.

Wireless LAN Connection Sequence

A sequence for establishing a wireless LAN connection between the digital camera 100 and the smartphone 200 will be described next with reference to FIGS. 7A and 7B.

The sequence illustrated in FIGS. 7A and 7B is executed by both the digital camera 100 and the smartphone 200 with a function for connecting to an external device using wireless LAN being enabled (a state in which the connection units 108 and 208 are operational). The connection units 108 and 208 can be switched between being enabled and disabled through any publicly-known method, such as operating the menu screen of the digital camera 100, operating a settings application in the smartphone 200, or the like. It is also assumed that no BLE connection is established, and that a handover from BLE cannot be performed. Furthermore, it is assumed that the digital camera 100 and the smartphone 200 are within a distance at which wireless LAN communication is possible.

At T701, the control unit 101 starts the connection unit 108 to operate as a simple AP. Through this, the connection unit 108 periodically broadcasts a wireless LAN advertisement signal (a beacon frame) for communicating its own presence. It is assumed here that the wireless LAN advertisement signal includes at least an application ID, a name, and a wireless LAN MAC address as device information of the digital camera 100.

The application ID is an identifier for uniquely identifying a connection destination device. This ID is specified only when requesting reconnection to a specific device. For example, if the device has established a connection with the smartphone 200 in the past and is requesting reconnection to the smartphone 200, an application ID previously obtained from the smartphone 200 is specified. The application ID is specified only during reconnections, and is not specified when making a new connection (is blank without any value).

At T702, the control unit 201 of the smartphone 200 starts the connection unit 208, and starts processing for searching for a wireless LAN advertisement signal.

At T703, the control unit 201 receives, through the connection unit 208, the wireless LAN advertisement signal transmitted by the digital camera 100.

At T704, the control unit 201 analyzes the received wireless LAN advertisement signal and obtains the device information of the digital camera 100. The control unit 201 checks whether the application ID included in the device information is blank, determines that a new connection is being requested if the ID is blank, and executes T705. On the other hand, if the application ID is not blank, the control unit 201 checks whether the application ID matches the application ID of the smartphone 200. If the application IDs match, the control unit 201 determines that the digital camera 100 is requesting a reconnection to the smartphone 200, and executes T710. However, if the application IDs do not match, the control unit 201 determines that the request is a request to reconnect to another device. In this case, if no other advertisement signal is being received, the control unit 201 may terminate the operations by the connection unit 208.

Here, it is assumed that the application ID in the device information included in the advertisement signal is blank.

At T705, the control unit 201 displays, in the display unit 206, a screen inquiring with the user as to whether to start a connection using wireless LAN. The control unit 201 can display a screen including the name of the digital camera 100 from which the device information was obtained, as well as options such as "connect" and "cancel", for example.

For example, upon detecting an operation instructing a connection to be made, such as the "connect" button being pressed, the control unit 201 executes T706, whereas upon detecting an operation instructing a connection not to be made, such as the "cancel" button being pressed, the subsequent processing is not performed. In this case, the control unit 201 may skip executing T702, or may terminate the operations of the connection unit 208.

At T706, the control unit 201 transmits a connection start request from the connection unit 208 to the digital camera 100. The connection start request is assumed to include at least the application ID and the name as the device information of the smartphone 200.

The control unit 101 receives the connection start request from the smartphone 200 through the connection unit 108. The control unit 101 then checks whether the application ID included in the device information in the connection start request from the smartphone 200 is stored in the non-volatile memory 103. If the application ID in the received device information is not stored in the non-volatile memory 103, the control unit 101 determines that the connection start request is from a new device, and executes T707. On the other hand, if the application ID in the received device information is already stored in the non-volatile memory 103, the control unit 101 determines that the request is for reconnection, and executes T711. This corresponds to a case where a connection start request transmitted in T710 is received.

At T707, the control unit 101 displays, in the display unit 106, a screen inquiring with the user as to whether to start a connection using wireless LAN. The control unit 101 can display a screen including the name of the smartphone 200 from which the device information was obtained, as well as options such as "connect" and "cancel", for example.

Upon detecting an operation made on the screen, the control unit 101 transmits a response signal according to the result of the detection from the connection unit 108 to the smartphone 200. For example, upon detecting an operation instructing a connection to be made, such as the "connect" button being operated, the control unit 101 transmits a response signal permitting the connection. On the other hand, upon detecting an operation instructing a connection not to be made, such as the "cancel" button being operated, the control unit 101 transmits a response signal that does not permit the connection. It is assumed here that a response signal permitting the connection has been transmitted.

Upon receiving the response signal permitting the connection from the digital camera 100 through the connection unit 208, the control unit 201 executes processing for establishing a connection with the control unit 101. A wireless LAN connection is established between the digital camera 100 and the smartphone 200 as a result.

Once the wireless LAN connection is established, at T708, the control unit 101 stores the device information of the smartphone 200 (here, the application ID and the device name) in the non-volatile memory 103. The device information can be stored in the non-volatile memory 103 of the digital camera 100 in the same manner as the camera information indicated in FIG. 6.

At T709, the control unit 201 stores the device information of the digital camera 100 (here, the name and the wireless LAN MAC address) in the non-volatile memory 203 as the camera information.

In the case of a reconnection, at T710, the control unit 201 transmits a connection start request, in which the connecting application ID of the smartphone 200 is set in the device information, from the connection unit 208 to the digital camera 100. As described above, the control unit 101 determines that the connection start request is a reconnection request based on the connecting application ID.

When a reconnection request is received, the control unit 101 transmits a response signal permitting the connection at T711, without inquiring with the user as to whether to start the connection. The control units 201 and 101 then establish a connection in the same manner as when a new connection request is made. In the case of a reconnection, the control units 101 and 201 do not newly store the device information of their connection partners. Note that as described above, already-registered names may be updated as necessary.

Bluetooth Connection Sequence

A sequence for establishing a Bluetooth (BLE) connection between the digital camera 100 and the smartphone 200 will be described next with reference to FIGS. 8A and 8B.

The sequence illustrated in FIGS. 8A and 8B is executed by both the digital camera 100 and the smartphone 200 with a function for connecting to an external device using BLE being enabled (a state in which the short-range wireless communication units 112 and 212 are operational). The short-range wireless communication units 112 and 212 can be switched between being enabled and disabled through any publicly-known method, such as operating the menu screen of the digital camera 100, operating a settings application in the smartphone 200, or the like. Furthermore, it is assumed that the digital camera 100 and the smartphone 200 are within a distance at which BLE communication is possible.

At T801, the control unit 101 causes the short-range wireless communication unit 112 to periodically broadcast a BLE advertisement signal for communicating its own presence to surrounding devices. It is assumed here that the BLE advertisement signal includes at least an application ID and the name as device information of the digital camera 100.

In the case of a new connection, the control unit 101 sets the application ID in the device information to black, in the BLE advertisement signal as well. Additionally, in the case of a request to connect to a specific device, the control unit 101 sets an application ID corresponding to that device in the BLE advertisement signal.

At T802, the control unit 201 causes the short-range wireless communication unit 212 to start BLE advertisement signal search processing.

At T803, the control unit 201 receives, through the short-range wireless communication unit 212, the BLE advertisement signal transmitted by the digital camera 100.

At T804, the control unit 201 analyzes the received BLE advertisement signal and obtains the device information of the digital camera 100. The control unit 201 checks whether the application ID included in the device information is blank, determines that a new connection is being requested if the ID is blank, and executes T805. On the other hand, if the application ID is not blank, the control unit 201 checks whether the application ID matches the application ID of the smartphone 200. If the application IDs match, the control unit 201 determines that the digital camera 100 is requesting a reconnection to the smartphone 200, and executes T814. However, if the application IDs do not match, the control unit 201 determines that the request is a request to reconnect to another device. In this case, the control unit 201 can execute the search operations of T802.

Here, it is assumed that the application ID in the device information included in the advertisement signal is blank.

At T805, the control unit 201 displays, in the display unit 206, a screen inquiring with the user as to whether to start a connection using BLE. The control unit 201 can display a screen including the name of the digital camera 100 from which the device information was obtained, as well as options such as "connect" and "cancel", for example.

For example, upon detecting an operation instructing a connection to be made, such as the "connect" button being pressed, the control unit 201 executes T806, whereas upon detecting an operation instructing a connection not to be made, such as the "cancel" button being pressed, the subsequent processing is not performed. In this case, the control unit 201 can execute the search operations of T802.

At T806, the control unit 201 transmits a connection start request from the short-range wireless communication unit 212 to the digital camera 100. The connection start request is assumed to include at least the application ID as the device information of the smartphone 200.

The control unit 101 receives the connection start request from the smartphone 200 through the short-range wireless communication unit 112. The control unit 101 then checks whether the application ID included in the device information in the connection start request from the smartphone 200 is stored in a non-volatile memory 103. If the application ID in the received device information is not stored in the non-volatile memory 103, the control unit 101 determines that the connection start request is from a new device. On the other hand, if the application ID in the received device information is already stored in the non-volatile memory 103, the control unit 101 determines that the request is for reconnection. This corresponds to a case where a connection start request transmitted in T819 (described later) is received. The control unit 101 transmits a response signal from the short-range wireless communication unit 112 to the smartphone 200, whether the request is for a new connection or for a reconnection.

At T807, the control unit 201 receives the response signal from the digital camera 100 through the short-range wireless communication unit 212. The control unit 201 displays, in the display unit 106, a screen inquiring with the user as to whether to start pairing with the digital camera 100. The control unit 201 can display a screen including the name of the digital camera 100 from which the device information was obtained, as well as options such as "pair" and "cancel", for example.

For example, upon detecting an operation instructing pairing to be performed, such as the "pair" button being pressed, the control unit 201 executes T808, whereas upon detecting an operation instructing pairing not to be performed, such as the "cancel" button being pressed, the subsequent processing is not performed. In this case, the control unit 201 can execute the search processing of T802.

At T808, the control unit 201 (the communication service 241) generates an encryption key for encrypted communication.

Then, at T809, the control unit 201 transmits an encryption key exchange request, to which the generated encryption key has been added, to the digital camera 100.

At T810, the control unit 101 receives the encryption key exchange request from the smartphone 200. The control unit 101 then stores the encryption key added to the encryption key exchange request in the non-volatile memory 103 in association with the identification information of the smartphone 200.

At T811, the control unit 101 generates an encryption key for encrypted communication.

Then, at T812, the control unit 101 transmits an encryption key exchange response, to which the generated encryption key has been added, to the smartphone 200.

At T813, the control unit 201 receives the encryption key exchange response from the digital camera 100. The control unit 201 then registers the encryption key added to the encryption key exchange response to the communication service 241 of the OS 240. In this case, the identification information assigned by the OS to the digital camera 100 may be associated with the encryption key. Note that in actuality, the encryption key may be stored in the non-volatile memory 203. Encrypted communication (a BLE connection) is established between the digital camera 100 and the smartphone 200 as a result.

Once the BLE connection is established, at T814, the control unit 201 transmits a registration request including the device information of the smartphone 200 to the digital camera 100. The device information is assumed to include at least the application ID and the name of the smartphone 200.

Upon receiving the registration request from the smartphone 200 through the short-range wireless communication unit 112, at T815, the control unit 101 displays, in the display unit 106, a screen inquiring with the user as to whether to register the smartphone 200. The control unit 101 can display a screen including the name of the smartphone 200 from which the device information was obtained, as well as options such as "register" and "cancel", for example.

Upon detecting an operation made on the screen, the control unit 101 transmits a response signal according to the result of the detection from the short-range wireless communication unit 112 to the smartphone 200. For example, upon detecting an operation instructing registration to be performed, such as the "register" button being pressed, the control unit 101 transmits a response signal permitting the registration. On the other hand, upon detecting an operation instructing registration not to be performed, such as the "cancel" button being pressed, the control unit 101 transmits a response signal that does not permit the registration. It is assumed here that a response signal permitting the registration has been transmitted.

At T816, the control unit 101 stores the device information of the smartphone 200 included in the registration request received at T814 in the non-volatile memory 103.

At T817, the control unit 201 transmits a wireless LAN MAC address obtainment request signal to the digital camera 100 through the short-range wireless communication unit 212 in order to obtain the identification information of the digital camera 100.

The control unit 101 receives the wireless LAN MAC address obtainment request signal from the smartphone 200 through the short-range wireless communication unit 112. The control unit 101 generates a response signal including the wireless LAN MAC address of the connection unit 108 and transmits that signal from the short-range wireless communication unit 112 to the smartphone 200.

At T818, the control unit 201 obtains the wireless LAN MAC address of the digital camera 100 from the response signal received through the short-range wireless communication unit 212. Then, the wireless LAN MAC address and the name of the digital camera 100 obtained from the BLE advertisement signal at T803 are stored in the non-volatile memory 203 as new camera information. The communication service 241 may also associate the wireless LAN MAC address with the encryption key stored at T813. This completes the processing for establishing a new connection between the digital camera 100 and the smartphone 200.

In the case of a reconnection, at T819, the control unit 201 transmits a connection start request, in which the connecting application ID of the smartphone 200 is set in the device information, from the short-range wireless communication unit 212 to the digital camera 100. As described above, the control unit 101 determines that the connection start request is a reconnection request based on the connecting application ID.

When a request for a reconnection is received, at T820, the control unit 101 reads out the encryption key of the smartphone 200 from the non-volatile memory 103. Likewise, at T821, the control unit 201 reads out the encryption key of the digital camera 100 from the communication service 241 (the non-volatile memory 203). The control units 101 and 201 then execute processing for establishing encrypted communication. Encrypted communication (a BLE connection) is established between the digital camera 100 and the smartphone 200 as a result.

Connections conforming to the wireless LAN and BLE standards can be established between the digital camera 100 and the smartphone 200 through the above-described sequences. In addition, by saving the information necessary to establish a connection with the partner device and using that information when reconnecting, the time required to reestablish the connection can be shortened.

On the other hand, if the information about the smartphone 200 remains undeleted on a digital camera for which the camera information has been deleted from the registered camera list in the camera communication application 230, a problem will occur at the next connection. If the information about the smartphone 200 remains in the digital camera 100, the smartphone 200 will be indicated to the digital camera 100 as a connection destination. When a connection to the smartphone 200 is indicated, the digital camera 100 will transmit an advertisement signal (a reconnection request) including the application ID of the smartphone 200.

However, an advertisement signal including the application ID of the smartphone 200 is received, the camera communication application 230 will not execute the reconnection processing until the source external device can be confirmed as being present in the registered camera list. This is because the camera communication application is configured to perform processing (e.g., displaying a unique menu screen) using registered camera information for already-registered digital cameras. As a result, the digital camera 100 repeatedly transmits reconnection requests. If an error state such as a time error arises, an error message is displayed in the display unit 106 of the digital camera 100, at which point the user finally notices the anomaly.

To increase the convenience for the user, when a reconnection request is received from an external device for which information is not present in (has been deleted from) the already-registered external device list (the registered camera list), it is necessary to promptly notify the user to delete the information about the smartphone 200 from the external device.

The unique information (identification information) of the external device is required in order to determine whether the information of the external device that transmitted the reconnection request is present in the already-registered external device list. On the other hand, the timing at which the identification information of an external device can be obtained differs depending on the communication standard.

For example, in the case of the wireless LAN standard, the MAC address included in the advertisement signal can be used as identification information for external devices. On the other hand, in the case of the BLE standard, the advertisement signal does not include the identification information of external devices. Note that the name of the device in the advertisement signal can be set as desired by the user, and therefore cannot be used as identification information for the external device. Accordingly, when a BLE reconnection is requested, it is necessary to communicate with the external device and obtain the identification information.

Accordingly, the smartphone 200 according to the present embodiment changes the sequence for the case where a reconnection request is received from an external device (T710 and on in FIG. 7B, T819 and on in FIG. 8B) in the manner described hereinafter.

Specifically, when a reconnection request is received from an external device, the smartphone 200 obtains the identification information of the external device through a method according to the communication standard, and determines whether connection information of the external device is stored. Then, if it is determined that the connection information is not stored, the smartphone 200 promptly terminates the reconnection sequence, and prompts the user to delete the connection information of the smartphone 200 stored in the external device.

Wireless LAN Reconnection Sequence

A sequence for establishing a wireless LAN reconnection between the digital camera 100 and the smartphone 200 according to the present embodiment will be described next with reference to FIG. 9.

In the sequence chart in FIGS. 9, T901 to T904 are the same as T701 to T704 described with reference to FIG. 7A, and will therefore not be described here. At T904, the application ID of the smartphone 200 is included in the wireless LAN advertisement signal, and the processing performed after the control unit 201 determines that the signal is a reconnection request differs from that in FIGS. 7A and 7B. The operations of the control unit 201 described hereinafter are also implemented by the control unit 201 executing the camera communication application 230.

At T905, the control unit 201 obtains the wireless LAN MAC address included in the wireless LAN advertisement signal received at T903. Then, the control unit 201 refers to the registered camera list stored in the non-volatile memory 203, and confirms whether camera information having identification information matching the obtained MAC address is present.

If camera information having identification information matching the obtained MAC address is present in the registered camera list, the control unit 201 determines that reconnection is possible. The control unit 201 then executes T906.

At T906, the control unit 201 transmits a connection start request from the connection unit 208 to the digital camera 100, in the same manner as T710. Thereafter, the sequence described with reference to FIG. 7B is executed, and a reconnection between the smartphone 200 and the digital camera 100 is established.

On the other hand, if camera information having identification information matching the obtained MAC address is not present in the registered camera list, the control unit 201 determines that reconnection is not possible. This corresponds to a case where the stored camera information has been deleted from the registered camera list. The control unit 201 then executes T907.

At T907, the control unit 201 displays a warning screen in the display unit 206 prompting the user to delete the registered information of the smartphone 200 from the external device which is attempting to connect to the smartphone 200.

Figure 10A:
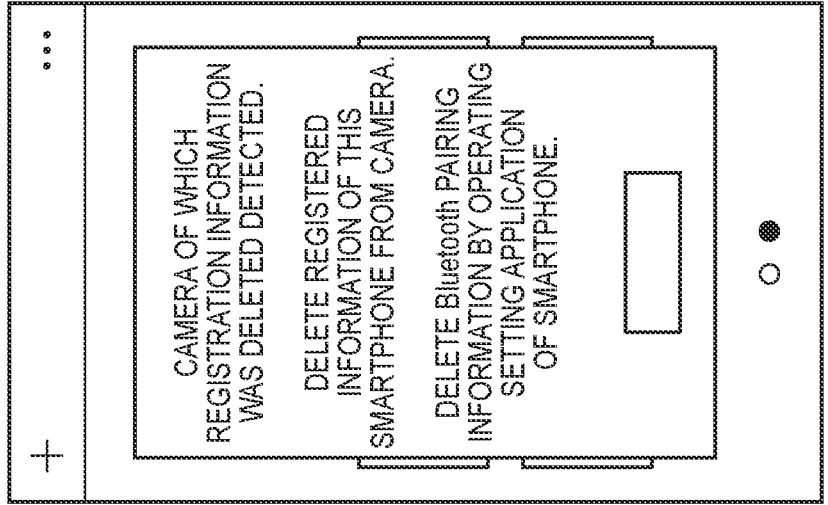
FIGS. 10A and 10B are diagrams illustrating examples of warning screens presented by the camera communication application according to embodiments.

FIG. 10A illustrates an example of the warning screen displayed in the display unit 206 at T907. The warning screen includes a message prompting the user to delete the information about the smartphone 200 registered in the digital camera 100. Note that the name of the digital camera 100, which is included in the advertisement signal, may be included in the warning screen to make it easier for the user to identify the device.

Figure 9:
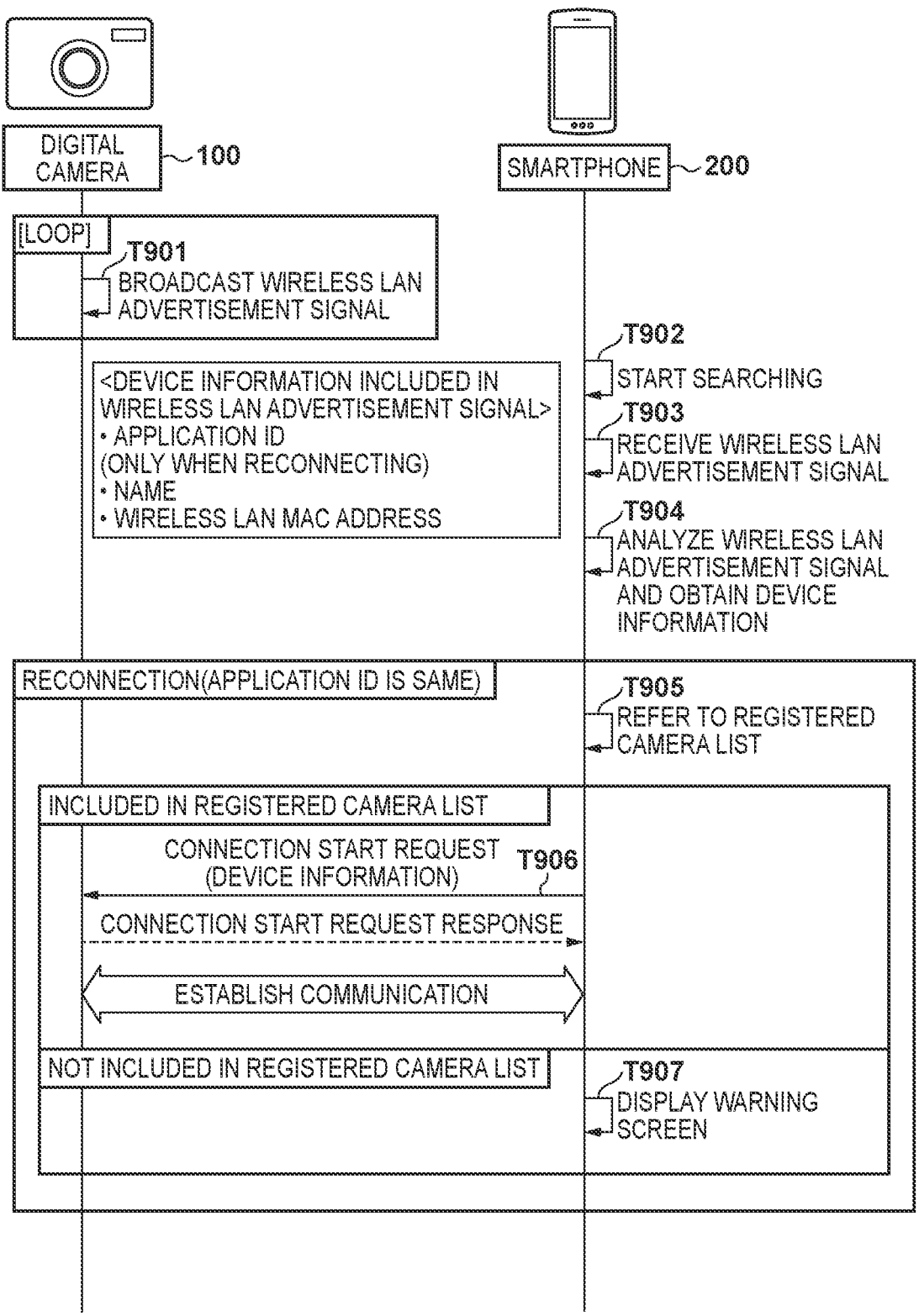
FIG. 9 is a sequence chart pertaining to wireless LAN reconnection operations between the digital camera and the smartphone according to embodiments.
Figure 11:
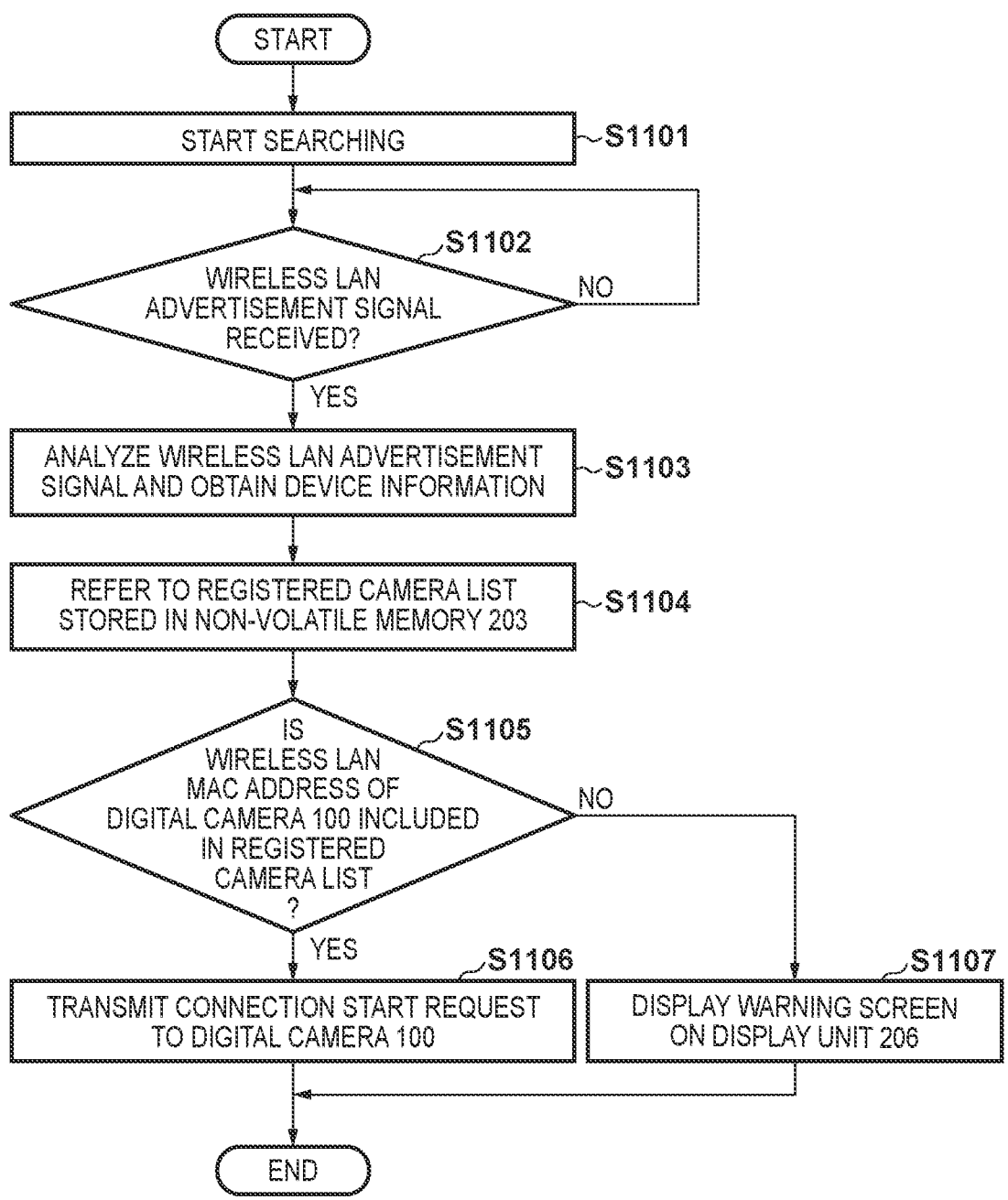
FIG. 11 is a flowchart pertaining to operations by the smartphone, corresponding to FIG. 9.

Operations by Smartphone 200 Corresponding to Wireless LAN Reconnection Sequence FIG. 11 is a flowchart pertaining to operations by the smartphone 200 indicated in the sequence chart illustrated in FIG. 9. The operations described hereinafter are realized by the control unit 201 executing the camera communication application 230.

In step S1101, the control unit 201 instructs the connection unit 208 to start searching for wireless LAN advertisement signals being transmitted to the network to which a connection is currently established (T902 in FIG. 9).

Next, in step S1102, the control unit 201 determines whether the connection unit 208 has received a wireless LAN advertisement signal, executes step S1103 if so (T903), and repeats step S1102 if not.

In step S1103, the control unit 201 analyzes the received wireless LAN advertisement signal, and obtains the device information (the application ID, the name, and the wireless LAN MAC address) of the source device (T904). This assumes a reconnection, and thus the device information is assumed to include the application ID of the smartphone 200.

In step S1104, the control unit 201 refers to the registered camera list stored in the non-volatile memory 203 using the wireless LAN MAC address included in the device information (T905).

In step S1105, the control unit 201 determines whether camera information that includes, as identification information, the wireless LAN MAC address included in the device information is present in the registered camera list, executes step S1106 if so, and executes step S1107 if not.

In step S1106, the control unit 201 transmits a connection start request from the connection unit 208 to the external device that transmitted the wireless LAN advertisement signal (the digital camera 100) (T906). Thereafter, the reconnection sequence with the digital camera 100 is executed, and a connection with the digital camera 100 is established, as described with reference to FIG. 7B. In this manner, when receiving an advertisement signal including its own application ID, the control unit 201 executes the reconnection procedure if the information about the external device that transmitted the advertisement signal is registered.

On the other hand, in step S1107, the control unit 201 displays a warning screen, such as that illustrated in FIG. 10A, on the display unit 206 (T907). In this manner, when receiving an advertisement signal including its own application ID, the control unit 201 does not execute the reconnection procedure if the information about the external device that transmitted the advertisement signal is not registered. The control unit 201 then displays a warning screen prompting the user to delete the information about the smartphone 200 registered in the external device which is attempting to connect to the smartphone 200.

Through this, the user can establish a connection between the smartphone 200 and the digital camera 100 by deleting the information about the smartphone 200 registered in the digital camera 100 and then starting the operations for connecting to the smartphone 200 again.

BLE Reconnection Sequence

A sequence for establishing a BLE reconnection between the digital camera 100 and the smartphone 200 according to the present embodiment will be described next with reference to FIGS. 12A and 12B.

In the sequence charts in FIGS. 12A and 12B, T1201 to T1207 are the same as T801 to T804 and T819 to T821 described with reference to FIGS. 8A and 8B, and will therefore not be described here.

After a connection with the digital camera 100 is established, in T1208, the control unit 201 transmits a request to obtain the identification information (the wireless LAN MAC address) to the digital camera 100 from the short-range wireless communication unit 212. In response, the control unit 101 transmits the MAC address of the connection unit 108 to the smartphone 200 through the short-range wireless communication unit 112.

At T1209, the control unit 201 refers to the registered camera list using the MAC address obtained from the digital camera 100. If camera information including the obtained wireless LAN MAC address as identification information is present in the registered camera list, a reconnection has already been established, and thus the processing ends without any action being taken.

On the other hand, if camera information including the obtained wireless LAN MAC address as the identification information is not present in the registered camera list, at T1210, the control unit 201 transmits a disconnect start request to the digital camera 100 from the short-range wireless communication unit 212.

Upon receiving the disconnect start request from the smartphone 200 through the short-range wireless communication unit 112, the control unit 101 transmits a disconnect start request response to the smartphone 200. The connection between the digital camera 100 and the smartphone 200 is terminated as a result.

At T1211, the control unit 201 displays a warning screen in the display unit 206 prompting the user to delete the registered information of the smartphone 200 from the external device which is attempting to connect to the smartphone 200.

Figure 10B:
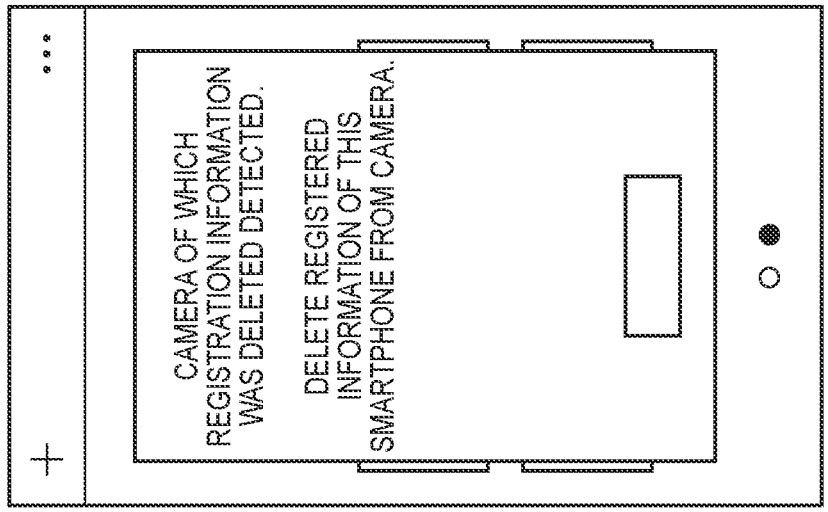

FIG. 10B illustrates an example of the warning screen displayed in the display unit 206 at T1211. The warning screen includes a message prompting the user to unpair the digital camera 100 and the smartphone 200 (delete the information about the smartphone 200). Note that the name of the digital camera 100, which is included in the advertisement signal, may be included in the warning screen to make it easier for the user to identify the device.

Through this, the user can establish a connection between the smartphone 200 and the digital camera 100 by deleting the information about the smartphone 200 registered in the digital camera 100 and then starting the operations for connecting to the smartphone 200 again.

Operations by Smartphone 200 Corresponding to BLE Reconnection Sequence

Figure 13:
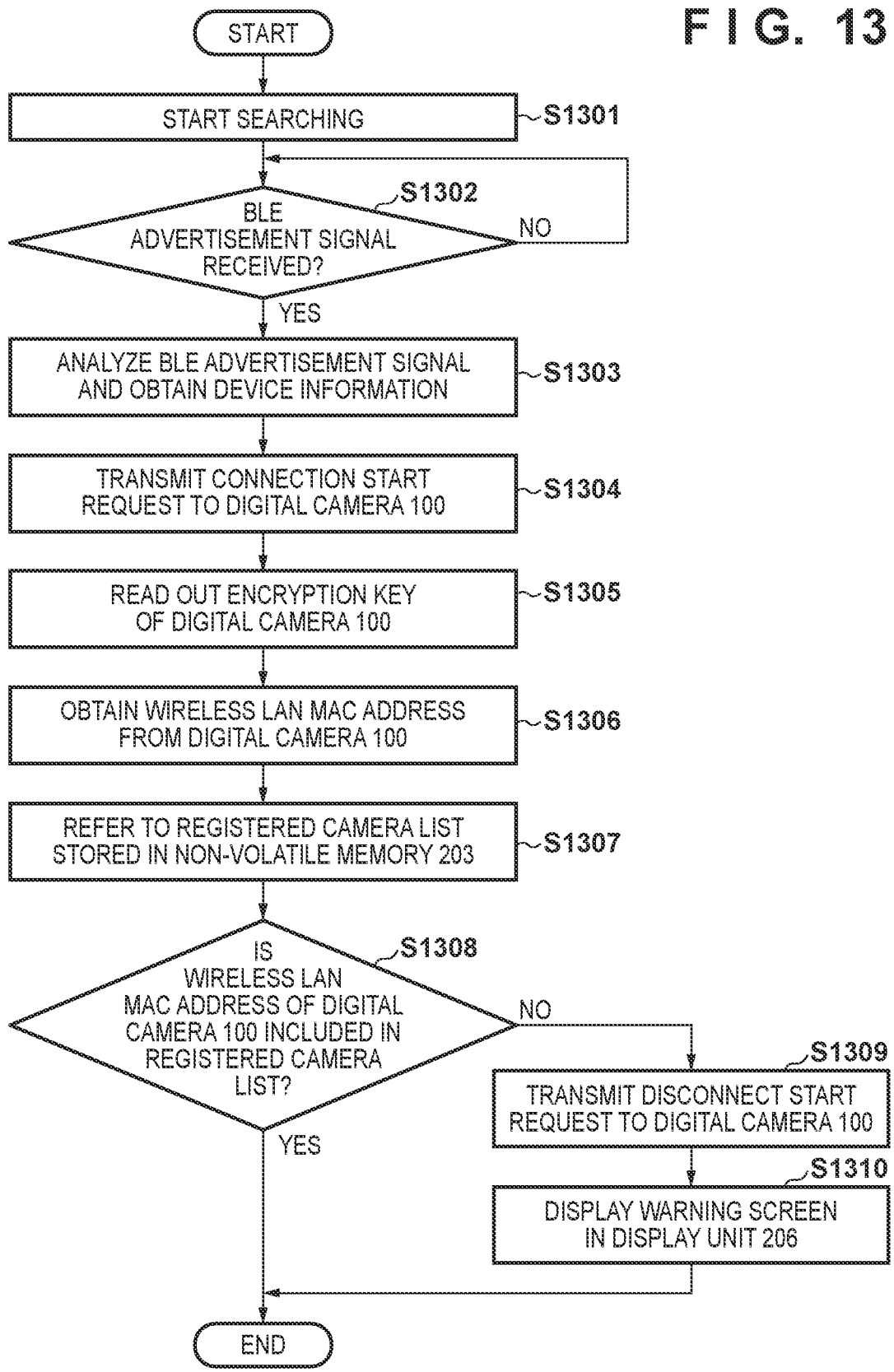
FIG. 13 is a flowchart pertaining to operations by the smartphone, corresponding to FIGS. 12A and 12B.

FIG. 13 is a flowchart pertaining to operations by the smartphone 200 indicated in the sequence chart illustrated in FIGS. 12A and 12B. The operations described hereinafter are realized by the control unit 201 executing the camera communication application 230.

In step S1301, the control unit 201 instructs the short-range wireless communication unit 212 to start searching for a BLE advertisement signal (T1202 in FIG. 11).

Next, in step S1302, the control unit 201 determines whether a BLE advertisement signal has been received by the short-range wireless communication unit 212, executes step S1303 if so (T1203), and executes S1302 if not.

In step S1303, the control unit 201 analyzes the received BLE advertisement signal, and obtains the device information (the application ID and the name) of the source device (T1204). This assumes a reconnection, and thus the device information is assumed to include the application ID of the smartphone 200.

In step S1304, the control unit 201 transmits a connection start request to the digital camera 100 through the short-range wireless communication unit 212 (T1205).

In step S1305, the control unit 201 reads out the encryption key of the digital camera 100, managed by the communication service 241, in order to start encrypted communication with the digital camera 100 (T1206). On the other hand, in the digital camera 100, the control unit 101 reads out the encryption key of the smartphone 200 in response to receiving the connection start request (T1207). ABLE connection is established between the digital camera 100 and the smartphone 200 as a result.

In step S1306, the control unit 201 transmits a request to obtain the identification information of the digital camera 100 (here, the wireless LAN MAC address) through the short-range wireless communication unit 212 (T1208), and obtains the MAC address.

In step S1307, the control unit 201 refers to the registered camera list stored in the non-volatile memory 203 using the MAC address obtained from the digital camera 100 (T1209).

In step S1308, the control unit 201 determines whether camera information including the obtained wireless LAN MAC address as the identification information is present in the registered camera list, and terminates the processing of FIG. 13 if so. In other words, if the digital camera 100 that is the source of the reconnection request has not been deleted from the registered camera list, the control unit 201 maintains the established connection in step S1305.

On the other hand, if camera information including the obtained wireless LAN MAC address as the identification information is not determined to be present in the registered camera list, the control unit 201 executes step S1309.

In step S1309, the control unit 201 transmits a disconnect start request to the digital camera 100 from the short-range wireless communication unit 212 (T1210). Upon receiving the disconnect start request from the smartphone 200 through the short-range wireless communication unit 112, the control unit 101 transmits a disconnect start request response to the smartphone 200. The connection between the digital camera 100 and the smartphone 200 is terminated as a result.

In step S1310, the control unit 201 displays a warning screen (FIG. 10B) in the display unit 206 prompting the user to unpair the smartphone 200 from the digital camera 100 which is attempting to connect to the smartphone 200 (T1211). In other words, if the digital camera 100 that is the source of the reconnection request has been deleted from the registered camera list, the control unit 201 terminates the established connection in step S1305. Then, the control unit 201 prompts the smartphone 200 to be unpaired from the digital camera 100.

In this manner, when a reconnection request is received from an external device, the communication device according to the present embodiment can appropriately determine whether information about that external device is stored according to which communication standard the reconnection request pertains to. If the information is not stored, prompting the user to delete their own information from the external device makes it possible to assist the user in taking appropriate action without making the user wait longer than is necessary.

Second Embodiment

A second embodiment of the present invention will be described next. In the first embodiment, if the information about the external device that is the source of a reconnection request has been deleted from the communication device, a warning screen is displayed each time a reconnection request is received from the external device. In other words, the warning screen will be repeatedly displayed until the information about the communication device is deleted from that external device. It is also necessary to establish communication with the requesting external device and obtain the identification information each time a BLE reconnection request is received.

The present embodiment reduces the number of times the warning screen is displayed, and the number of times a connection is established with an external device requesting BLE reconnection, when a plurality of reconnection requests are received from the same external device.

Warned Camera List

FIG. 14 is a diagram illustrating an example of a warned camera list in which is registered the information about cameras deleted from the registered camera list by the smartphone 200. The warned camera list is stored in the non-volatile memory 203 or the working memory 204. To simplify the descriptions and facilitate understanding, FIG. 14 illustrates the warned camera list in table format, but the registered camera list may be stored in any format. The camera communication application 230 handles digital cameras for which information has been recorded in the warned camera list as digital cameras for which registration has been deleted.

The warned camera list includes an index 1401 and identification information 1402 for each camera.

The index 1401 is a numerical value indicating an index (a consecutive number), and is assigned in order from 1.

The identification information 1402 is unique information that differs for each individual digital camera. In the present embodiment, a character string indicating the MAC address allocated to the connection unit 108 (the wireless LAN interface) can be used as the identification information, in the same manner as in the first embodiment. Furthermore, the present embodiment assumes that identification information assigned by the OS can be used for digital cameras for which the registration has been deleted for BLE connections.

However, if the OS 240 of the smartphone 200 can obtain the MAC address of the short-range wireless communication unit 212 of a BLE device, the MAC address of the short-range wireless communication unit 212 may be used as the identification information 1402. Note that the identification information 1402 may be other information, such as a serial number or the like, as long as it is information that is different for each individual digital camera and can be obtained from the exterior.

The OS 240 (the communication service 241) assigns the identification information to a newly-paired BLE device and registers that identification information in the non-volatile memory 203, for example. The same identification information is used thereafter for the same BLE device. However, the identification information assigned by the OS 240 may be initialized when the OS 240 is updated or the like, and there is thus no guarantee that the identification information can be used indefinitely for the same BLE device. Accordingly, when identification information assigned by the OS is used as the identification information of the BLE device, the warned camera list is reset (deleted) when the camera communication application is terminated.

Operations by Smartphone 200 During Wireless LAN Reconnection Processing

FIG. 15 is a flowchart pertaining to operations performed by the smartphone 200 during wireless LAN reconnection processing according to the present embodiment. The operations described hereinafter are realized by the control unit 201 executing the camera communication application 230. The states of the smartphone 200 and the digital camera 100 before starting the processing are the same as in the first embodiment.

Steps S1501 to S1503 are the same as steps S1101 to S1103 in FIG. 11, and will therefore not be described here. This assumes a reconnection, and thus the device information in the wireless LAN advertisement signal is assumed to include the application ID of the smartphone 200.

In step S1504, the control unit 201 refers to the warned camera list stored in the non-volatile memory 203 or the working memory 204 using the wireless LAN MAC address included in the device information obtained in step S1503.

In step S1505, the control unit 201 determines whether the wireless LAN MAC address included in the device information is included in the warned camera list as the identification information, terminates the reconnection processing if so, and executes step S1506 if not.

In this manner, in the present embodiment, if a detected wireless LAN device is a device registered in the warned camera list (a device which has been deleted from the registered camera list), the reconnection processing is terminated without making a warning.

Steps S1506 to S1509 are the same as steps S1104 to S1107 in FIG. 11, and will therefore not be described here.

In step S1510, the control unit 201 adds the identification information of the digital camera 100 (the wireless LAN MAC address obtained in step S1503) to the warned camera list, and then terminates the reconnection processing. If a warned camera list has not yet been generated, the control unit 201 generates a new warned camera list.

According to the present embodiment, when a wireless LAN reconnection request is received from an external device which has been deleted from the registered list, a warning screen is displayed only for the first reconnection request, but not for second and subsequent reconnection requests. This makes it possible to avoid repeatedly displaying warning screens when reconnection requests are repeatedly received from an external device.

Operations by Smartphone 200 During BLE Reconnection Processing

FIG. 16 is a flowchart pertaining to operations performed by the smartphone 200 during BLE reconnection processing according to the present embodiment. The operations described hereinafter are realized by the control unit 201 executing the camera communication application 230. The states of the smartphone 200 and the digital camera 100 before starting the processing are the same as in the first embodiment.

Steps S1601 to S1603 are the same as steps S1301 to S1303 in FIG. 13, and will therefore not be described here. This assumes a reconnection, and thus the device information in the BLE advertisement signal is assumed to include the application ID of the smartphone 200.

In step S1604, the control unit 201 obtains, from the communication service 241 of the OS 240, the identification information allocated to the external device that is the source of the BLE advertisement signal (the digital camera 100) by the communication service 241.

In step S1605, the control unit 201 refers to the warned camera list stored in the non-volatile memory 203 or the working memory 204 using the identification information obtained in step S1604.

In step S1606, the control unit 201 determines whether the warned camera list includes identification information allocated to the digital camera 100 by the OS 240 (the communication service 241), terminates the reconnection processing if so, and executes step S1607 if not.

In this manner, in the present embodiment, if a detected BLE device is a device registered in the warned camera list (a device which has been deleted from the registered camera list), the reconnection processing is terminated without making a warning.

Steps S1607 to S1613 are the same as steps S1304 to S1310 in FIG. 13, and will therefore not be described here.

In step S1614, the control unit 201 adds the identification information of the digital camera 100 (the identification information allocated by the OS 240 (the communication service 241), obtained in step S1504) to the warned camera list, and then terminates the reconnection processing. If a warned camera list has not yet been generated, the control unit 201 generates a new warned camera list.

According to the present embodiment, when a BLE reconnection request is received from an external device which has been deleted from the registered list, a warning screen is displayed only for the first reconnection request, but not for second and subsequent reconnection requests. This makes it possible to avoid repeatedly displaying warning screens when reconnection requests are repeatedly received from an external device.

Although the foregoing has described not displaying a warning screen for second and subsequent reconnection requests as an example, the frequency with which the warning screen is displayed may be reduced, such as by displaying the warning screen once every n times (where n>2) after the second reconnection request. In this case, the control unit 201 stores the number of times the warning screen is not displayed, and performs control to display the warning screen the next time a reconnection request is received once that number has reached n.

Other Embodiments

The foregoing embodiments described the wireless LAN standard as a communication standard in which an advertisement signal including identification information of the source device can be transmitted, and the BLE standard as a communication standard in which an advertisement signal including identification information of the source device cannot be transmitted. However, the present invention can be applied in a similar manner for other communication standards having similar characteristics.

Additionally, the foregoing embodiments described displaying a warning screen in the display unit 206 of the smartphone 200 when the smartphone 200 receives a reconnection request from an external device which has been deleted from the already-registered external device list. However, the smartphone 200 may establish a connection with the external device that is the source of the reconnection request and display a warning screen in the external device, transmit an instruction to delete the information of the smartphone 200, or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156469, filed on Sep. 29, 2022, which is hereby incorporated by reference herein in its entirety.

What is claimed is:

1. A communication device comprising:
   a first communication circuit capable of establishing a connection with an external device in accordance with a first communication standard;
   a second communication circuit capable of establishing a connection with an external device in accordance with a second communication standard;
   a storage device that stores information about one or more external devices registered in an application that uses communication with an external device; and
   one or more processors that execute a program stored in a memory and thereby function as:
   a control unit configured to, when a reconnection request is received from an external device through the first communication circuit or the second communication circuit, output a warning if a registration of the external device in the application has been deleted,
   wherein the control unit determines whether the registration of the external device in the application has been deleted based on identification information of the external device, the identification information being obtained through different procedures depending on through which of the first communication circuit and the second communication circuit the reconnection request has been received.

2. The communication device according to claim 1, wherein the control unit obtains the identification information without establishing a connection with the external device in a case where the reconnection request has been received through the first communication circuit, and obtains the identification information having established a connection with the external device in a case where the reconnection request has been received through the second communication circuit.

3. The communication device according to claim 2, wherein the control unit obtains the identification information from an advertisement signal of the external device in a case where the reconnection request has been received through the first communication circuit.

4. The communication device according to claim 1, wherein the control unit does not accept the reconnection request in a case where the registration of the external device in the application has been deleted.

5. The communication device according to claim 1, wherein the control unit reduces frequency of outputting the warning in a case where a reconnection request has been received a plurality of times from a same external device for which a registration in the application has been deleted.

6. The communication device according to claim 5, wherein the output of the warning is an output of a warning screen on a display device of the communication device.

7. The communication device according to claim 5, wherein the output of the warning is an output of a warning screen to the external device or a transmission of an instruction to delete information about the communication device from the external device.

8. The communication device according to claim 1, wherein the control unit stores information about an external device to the warning has output, and reduces frequency of outputting the warning if information about the external device that transmitted the reconnection request is stored.

9. The communication device according to claim 8, wherein in a case where identification information assigned to the external device by an operating system (OS) on which the application runs is stored as the information about the external device, the control unit deletes the stored information about the external device when the application is terminated.

10. The communication device according to claim 1, wherein a registration of the external device in an operating system (OS) on which the application runs is not deleted even if the registration of the external device in the application is deleted.

11. The communication device according to claim 1, wherein the first communication standard is a wireless local area network (LAN) standard, and the second communication standard is a Bluetooth Low Energy (BLE) standard.

12. A control method executed by a communication device, the communication device including:
a first communication circuit capable of establishing a connection with an external device in accordance with a first communication standard;
a second communication circuit capable of establishing a connection with an external device in accordance with a second communication standard; and
a storage device that stores information about one or more external device registered in an application that uses communication with an external device,
wherein the control method comprises, when a reconnection request has been received from an external device through the first communication circuit or the second communication circuit:
obtaining identification information of the external device through different procedures depending on through which of the first communication circuit and the second communication circuit the reconnection request has been received;
determining whether a registration of the external device in the application has been deleted based on the identification information; and
outputting a warning in a case where the registration of the external device in the application is determined to have been deleted.

13. A non-transitory computer-readable medium having stored therein a program which, when executed by a computer having a communication device, causes the computer to execute a method, wherein the communication device comprises:
a first communication circuit capable of establishing a connection with an external device in accordance with a first communication standard;
a second communication circuit capable of establishing a connection with an external device in accordance with a second communication standard; and
a storage device that stores information about one or more external devices registered in an application that uses communication with an external device, and
wherein the method comprising, when a reconnection request has been received from an external device through the first communication circuit or the second communication circuit:
obtaining identification information of the external device through different procedures depending on through which of the first communication circuit and the second communication circuit the reconnection request has been received;
determining whether a registration of the external device in the application has been deleted based on the identification information; and
outputting a warning in a case where the registration of the external device in the application is determined to have been deleted.

* * * * *